US011800193B2

United States Patent
Kou et al.

(10) Patent No.: US 11,800,193 B2
(45) Date of Patent: Oct. 24, 2023

(54) INTERACTION PROCESSING METHOD AND APPARATUS FOR INFORMATION FLOW, DEVICE, AND COMPUTER-READABLE STORAGE MEDIUM

(71) Applicant: Tencent Technology (Shenzhen) Company Limited, Shenzhen (CN)

(72) Inventors: Jing Kou, Shenzhen (CN); Qiqi Luo, Shenzhen (CN); Yanhui Shen, Shenzhen (CN); Jingwen Wang, Shenzhen (CN); Leibing Qiu, Shenzhen (CN); Junhui Xi, Shenzhen (CN); Qian Zhang, Shenzhen (CN); Runlin Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/720,094

(22) Filed: Apr. 13, 2022

(65) Prior Publication Data

US 2022/0239985 A1 Jul. 28, 2022

Related U.S. Application Data

(63) Continuation of application No. PCT/CN2021/086081, filed on Apr. 9, 2021.

(30) Foreign Application Priority Data

May 9, 2020 (CN) .................. 202010387982.X

(51) Int. Cl.
*H04N 21/4725* (2011.01)
*G06F 3/04817* (2022.01)
*G06F 3/0482* (2013.01)

(52) U.S. Cl.
CPC ....... *H04N 21/4725* (2013.01); *G06F 3/0482* (2013.01); *G06F 3/04817* (2013.01)

(58) Field of Classification Search
CPC ............ H04N 21/4725; H04N 21/4788; G06F 3/04817; G06F 3/0482; G06F 3/04842; G06F 3/04883
See application file for complete search history.

(56) References Cited

U.S. PATENT DOCUMENTS

| | | | |
|---|---|---|---|
| 2014/0164907 A1* | 6/2014 | Jung | G06F 3/0482 715/234 |
| 2014/0351717 A1 | 11/2014 | Pryor et al. | |

(Continued)

FOREIGN PATENT DOCUMENTS

| | | |
|---|---|---|
| CN | 106612230 A | 5/2017 |
| CN | 109146530 A | 1/2019 |

(Continued)

OTHER PUBLICATIONS

International Search Report and Written Opinion received for Application No. PCT/CN2021/086081 dated Jun. 25, 2021 (English and Chinese languages) (12 pages).

*Primary Examiner* — Cao H Nguyen
(74) *Attorney, Agent, or Firm* — Crowell & Moring LLP

(57) ABSTRACT

An interaction processing method and apparatus operates for an information flow. An information flow is displayed in an information flow region, which is inserted between information in the information flow. Interaction material is displayed in the interaction region and the information in the information flow is updated along with a position of the interaction region in an information flow display interface in response to a movement operation on the information flow. An interaction process is displayed in the interaction region when the position of the interaction region reaches a set (Continued)

position. The interaction process includes a process in which the interaction material changes with an interaction operation.

20 Claims, 13 Drawing Sheets

(56) References Cited

U.S. PATENT DOCUMENTS

| | | | |
|---|---|---|---|
| 2015/0177965 A1 | 6/2015 | Lee | |
| 2016/0202879 A1* | 7/2016 | Chen | H04L 51/52 715/753 |
| 2021/0407502 A1* | 12/2021 | Vescovi | G10L 15/19 |

FOREIGN PATENT DOCUMENTS

| | | |
|---|---|---|
| CN | 110278493 A | 9/2019 |
| CN | 111580913 A | 8/2020 |
| CN | 111580914 A | 8/2020 |

* cited by examiner

INTERACTION PROCESSING METHOD AND APPARATUS FOR INFORMATION FLOW, DEVICE, AND COMPUTER-READABLE STORAGE MEDIUM

RELATED APPLICATION

This application is a continuation of PCT Application No. PCT/CN2021/086081, filed Apr. 9, 2021, published as WO2021227724A1, entitled "INFORMATION FLOW INTERACTION PROCESSING METHOD AND APPARATUS, AND DEVICE AND COMPUTER STORAGE MEDIUM", which claims priority to Chinese Patent Application No. 202010387982.X, filed on May 9, 2020, each of which are incorporated herein by reference in their entirety.

FIELD OF THE TECHNOLOGY

This application relates to the Internet technologies, and in particular, to an interaction processing method and apparatus for an information flow.

BACKGROUND OF THE DISCLOSURE

With the development of computer technologies and information technologies, the display of information features diversification and individuality. As a popular display manner, an information flow mainly refers to displaying a plurality of pieces of information on an application program interface in a particular order, that is, in a streaming form, which can help users continuously obtain new information. The information flow can be widely applied to various scenarios, for example, application programs such as information application programs, social application programs, and video application programs.

SUMMARY

Embodiments of this application provide an interaction processing method and apparatus for an information flow, an electronic device, and a non-transitory computer-readable storage medium, to implement diversified and efficient interaction in an information flow.

The technical solutions in the embodiments of this application are implemented as follows:

An embodiment of this application provides an interaction processing method for an information flow, performed by an electronic device, the method including:
displaying an information flow in an information flow region;
inserting at least one interaction region between information in the information flow, and displaying at least one interaction material in the interaction region; and
updating the information in the information flow and a position of the interaction region in an information flow display interface in response to a movement operation on the information flow, and displaying an interaction process in the interaction region when the position of the interaction region reaches a set position,
the interaction process including a process in which the at least one interaction material changes with an interaction operation.

An embodiment of this application provides an interaction processing apparatus for an information flow, including:
an information flow framework layer, configured to display an information flow in an information flow region,
the information flow framework layer being further configured to insert at least one interaction region between information in the information flow, and display at least one interaction material in the interaction region; and
the information flow framework layer being further configured to update the information in the information flow and a position of the interaction region in an information flow display interface in response to a movement operation on the information flow, and
display an interaction process in the interaction region when the position of the interaction region reaches a set position,
the interaction process including a process in which the at least one interaction material changes with an interaction operation.

An embodiment of this application provides an electronic device, including:
a memory, configured to store executable instructions; and
a processor, configured to implement, when executing the executable instructions stored on the memory, the interaction processing method for an information flow provided in the embodiments of this application.

An embodiment of this application provides a non-transitory computer-readable storage medium, storing executable instructions, the executable instructions, when executed by a processor, implementing the interaction processing method for an information flow provided in this embodiment of this application.

The embodiments of this application have the following beneficial effects:

An interaction region is inserted into an information flow, so that the interaction region is integrated into the information flow in a form of information. Two highly frequent application scenarios, that is, a scenario of browsing information in an information flow and an interaction scenario, are seamlessly integrated, to break a boundary between different application scenarios, so that a process of browsing an information flow is no longer limited to an information browsing function. Because the interaction region can flexibly access various interaction scenarios, not only various forms of interaction can be performed at any time in the process of browsing the information flow, but also efficient integration of diversified application scenarios is implemented. Moreover, due to the integration of the information flow and various interaction scenarios, the user shunting caused by page jumps from information flow to various interactive scenarios is reduced.

DESCRIPTION OF EMBODIMENTS

Figure 1A:
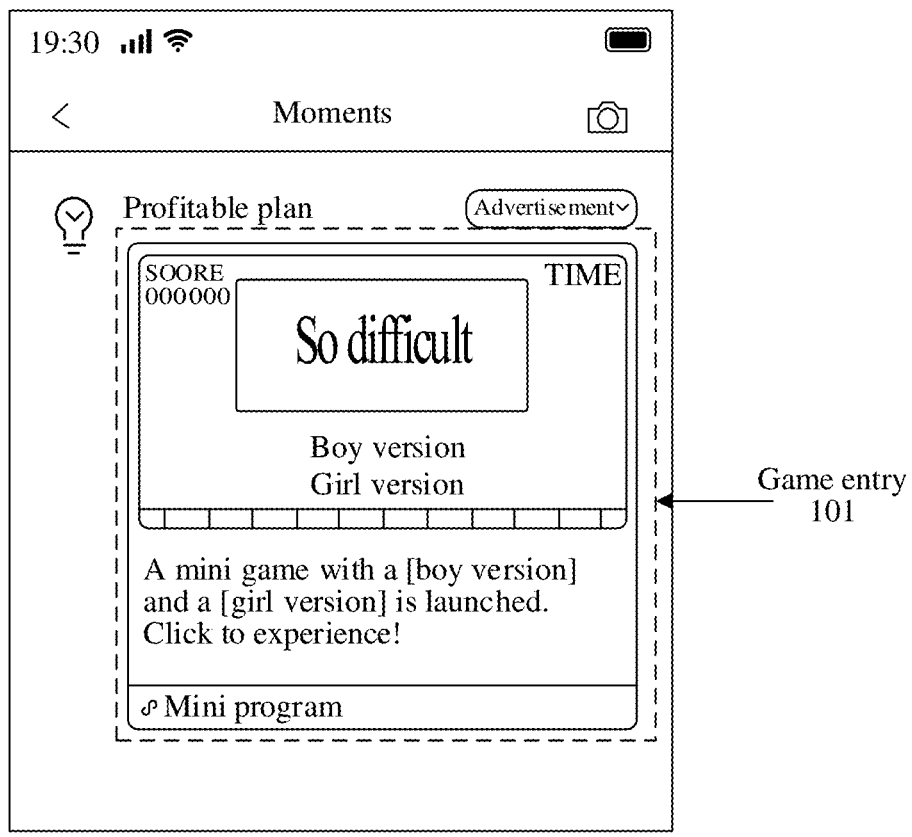
FIG. 1A and FIG. 1B are schematic diagrams of application scenarios according to related art.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second" is merely intended to distinguish similar objects but does not necessarily indicate a particular order of an object. It may be understood that "first/second" is interchangeable in terms of a particular order or sequence if permitted, so that the embodiments of this application described herein can be implemented in a sequence in addition to the sequence shown or described herein. In the following description, the term "plurality of" involved means at least two.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, terms involved in the embodiments of this application are described. The terms provided in the embodiments of this application are applicable to the following explanations.

1) A model-view-controller (MVC) framework is an architecture that separates service logic, data, and interface display, where the view (or interface view) is mainly responsible for the interface display, the model is mainly responsible for data management, and the controller (or interface view controller) is used to coordinate the view and the model.

2) An information flow is a manner of displaying information, for example, may include displaying a group of pieces of information (a plurality of pieces of information) in a set information flow region of an application program interface, and positions of the information in the information flow region may be updated according to a particular operation (for example, a movement operation). In an interface view of the application program, an information flow in the information flow region is displayed by an information flow framework layer.

3) Information refers to content of a single piece of information in the information flow, and a tabular structure of a piece of information includes the following elements: a title, an accompanying figure (for example, a large figure, double figures, triple figures, or a plurality of figures), a source, negative feedback, a button, and the like.

4) An interaction region refers to a region used to provide an interaction function in the application program interface, and an embodiment of this application includes additional examples of content in the interaction region, for example, may be a mini game, a short video, a live stream, an advertisement, or the like. In the interface view, the content in the interaction region is displayed by an interaction layer.

5) A search region refers to a region in the application program interface used to provide an information search function, which can be displayed in a form of a search box or the like. In the interface view, content in the search region is displayed by a search layer.

6) An interaction material refers to a material corresponding to the interaction region, that is, the material used for interaction in response to an interaction operation. There can be a number of examples of types of the interaction material in the embodiments of this application. As just one example, there may be at least one of an interaction element or an interaction introduction. The interaction element refers to various visual objects that participate in a man-machine interaction operation in an interaction process, and may have a position and/or a display effect changed according to the man-machine interaction operation. The interaction introduction refers to an introduction of the interaction process, and may be displayed in a form of text or images.

7) An interaction process refers to a process of contacting and interacting with each other, that is, a process in which the content in the interaction region (that is, the interaction material) changes with the interaction operation on the interaction region.

8) A HyperText Markup Language 5 (H5) mini game refers to a web game, that is, a game that the user can experience without downloading an application program.

Figure 1B:
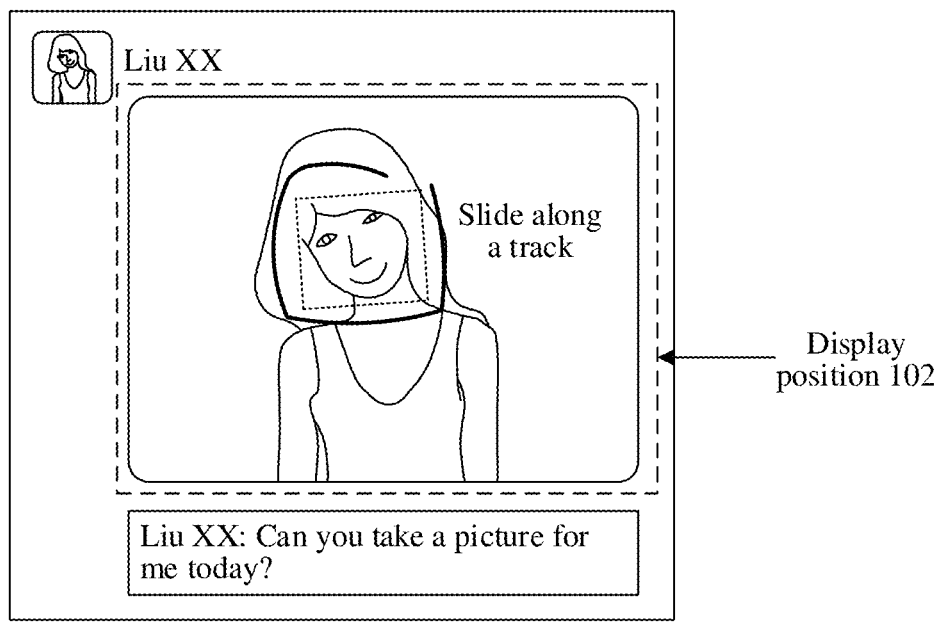

In related art, an interaction manner in the information flow is mainly that after the user performs an active operation (for example a click or tap operation) on the display position, a details page corresponding to the information can be jumped to, so as to display the details page through a page region larger than a page region in which the foregoing display position is located. FIG. 1A and FIG. 1B are schematic diagrams of application scenarios according to related art.

In FIG. 1A, using an example in which information included in the interaction region in the information flow is a mini game, when the user needs to interact with the mini game in the information flow, the user needs to click or tap a game entry 101 to open a link of the mini game, and then jump into the mini game. In the foregoing solution, because the mini game is not integrated with the information flow framework layer, the user cannot experience the mini game in a process of browsing the information flow. In FIG. 1B, the user can only implement a simple gesture interaction operation in a display position 102 of information, for example, an operation such as sliding along a track, which cannot allow the user to fully experience the interaction process. An interaction solution of the information flow may have been only limited to information in the information flow. However, it is difficult for such an undiversified interaction manner to support increasingly diverse application scenarios currently, and frequent switching processes between the mini game and the information flow neither is conducive to improving the efficiency of man-machine interaction, nor can effectively attract the user to retain in the information flow, resulting in a waste of computing resources used by an electronic device for displaying the information flow.

In view of the foregoing technical problems, the embodiments of this application provide an interaction processing method and apparatus for an information flow, an electronic device, and a computer-readable storage medium, to enable users to interact with information in the information flow, thereby effectively improving the actual utilization of computing resources of the electronic device. Example applications of the electronic device provided in the embodiments of this application are described below. The electronic device provided in the embodiments of this application can be implemented as various types of user terminals such as a notebook computer, a tablet computer, a desktop computer, a set-top box, and a mobile device (such as a mobile phone, a portable music player, a personal digital assistant, a dedicated messaging device, or a portable game device). Example applications with a device implemented as a terminal are described below.

Figure 2:
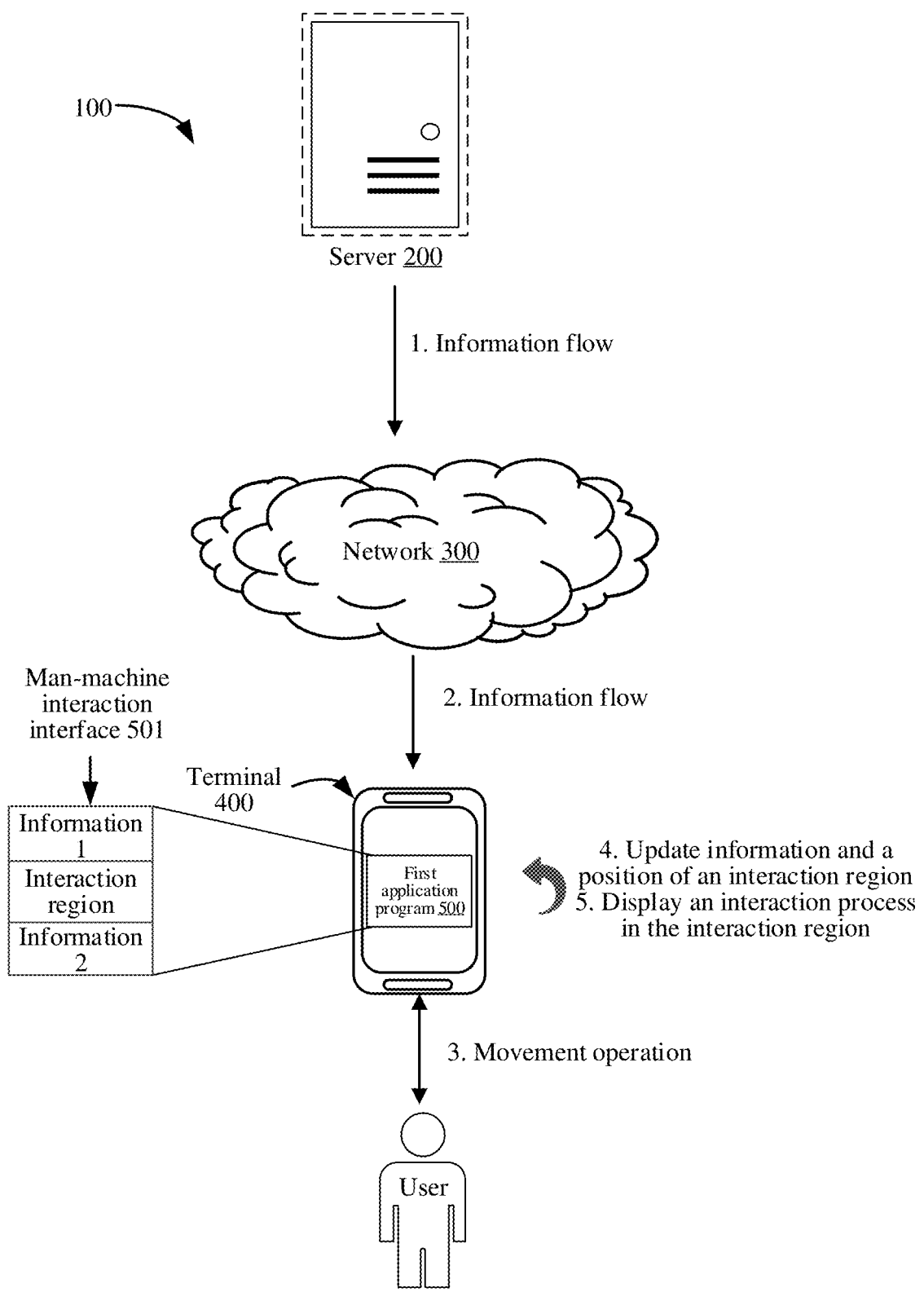
FIG. 2 is a schematic architectural diagram of an interaction processing system according to an embodiment of this application.

FIG. 2 is a schematic architectural diagram of an interaction processing system 100 according to an embodiment of this application. The interaction processing system 100 includes: a server 200, a network 300, a terminal 400, and a first application program 500 run on the terminal 400, which are described respectively.

In some embodiments, the interaction processing method for an information flow provided in the embodiments of this application may be cooperatively implemented by a terminal device and a server.

The server 200 is a backend server of the first application program 500, and is configured to transmit an information flow to the first application program 500 may be according to a preference of a user or randomly.

The network 300, used as a medium for communication between the server 200 and the terminal 400, may be a wide area network or a local area network, or a combination of the two.

The terminal 400 is configured to run the first application program 500. The first application program 500 is an application program with an information flow display function. The first application program 500 is configured to display, in a man-machine interaction interface 501, an information flow transmitted by the server 200, an interaction region being inserted between information in the information flow; and is further used to update the information in the information flow and a position of the interaction region in an information flow display interface in response to a movement operation of the user, and display a corresponding interaction process in the interaction region when a position of the interaction region reaches a set position.

In some embodiments, the first application program 500 may be a browser, and interaction information displayed in the interaction region may be an H5 mini game. When the browser is opened in response to a trigger operation of the user, and updates an information position in the information flow in response to a sliding down operation, interaction information may be randomly embedded in the process of updating the information position in the information flow. When a top part of the interaction information reaches the set position, a mini game state is triggered, and in response to the trigger operation of the user on the interaction information, the mini game can be started. A game interaction operation can be directly received in the interaction region of the interaction information to implement game interaction. When being received outside the interaction region, the interaction operation does not take effect in the mini game. When other information flow content outside the interaction region is clicked or tapped, a details page of the clicked or tapped information flow content is jumped to according to normal logic, and the mini game interaction is ended at the same time.

In some embodiments, the interaction processing method for an information flow provided in the embodiments of this application may be implemented by a terminal device. For example, when an application program (for example, an offline application program) is started, or a refresh operation on an information flow in a corresponding application program is received, the terminal device 400 can obtain a corresponding information flow through local query and display the information flow. In an embodiment of this application, a storage position of the information flow is not limited to a database and the terminal device 400 and may include additional components in other examples. For example, the information flow may be stored at a position such as a blockchain network or a distributed file system of the server 200.

In some embodiments, a server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. A terminal device may be various types of terminal devices such as a notebook computer, a tablet computer, a desktop computer, a set-top box or a mobile device (for example, a mobile phone, a portable music player, a personal digital assistant (PDA), a dedicated messaging device, or a portable game device), but there may be additional examples. The terminal device and the server may be directly or indirectly connected in a wired or wireless communication manner. The embodiments include other example arrangements and connections.

Figure 3:
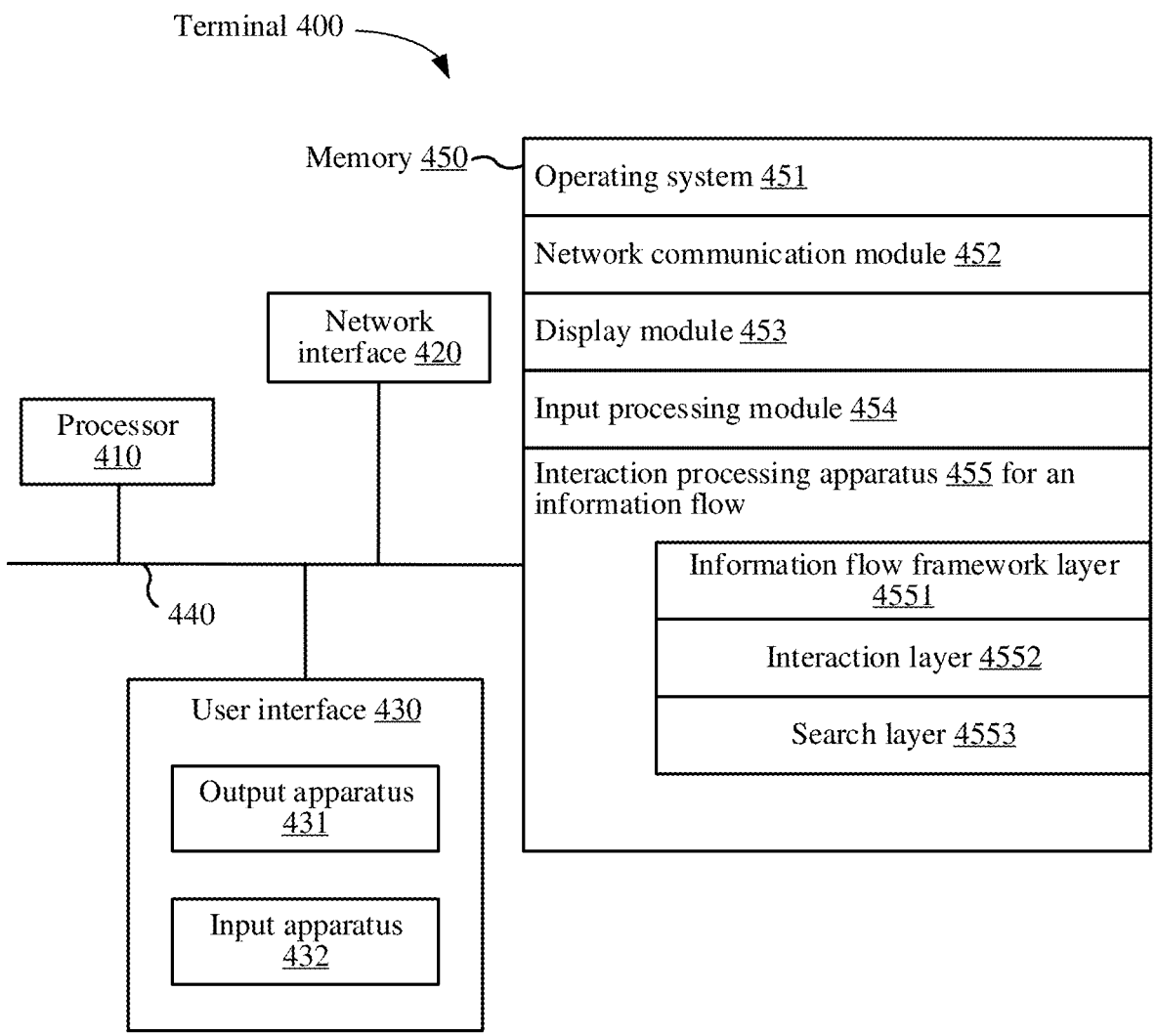
FIG. 3 is a schematic structural diagram of a terminal according to an embodiment of this application.

FIG. 3 is a schematic structural diagram of a terminal 400 according to an embodiment of this application. The terminal 400 shown in FIG. 3 includes: at least one processor 410, a memory 450, at least one network interface 420, and a user interface 430. All the components in the terminal 400 are coupled together by a bus system 440. It may be understood that the bus system 440 is configured to implement connection and communication between the components. In addition to a data bus, the bus system 440 further includes a power bus, a control bus, and a status signal bus. However, for ease of clear description, all types of buses are marked as the bus system 440 in FIG. 3.

The processor 410 may be an integrated circuit chip having a signal processing capability, for example, a general purpose processor, a digital signal processor (DSP), or another programmable logic device (PLD), discrete gate, transistor logical device, or discrete hardware component.

The general purpose processor may be a microprocessor, any conventional processor, or the like.

The user interface 430 includes one or more output apparatuses 431 that can display media content, including one or more loudspeakers and/or one or more visual display screens. The user interface 430 further includes one or more input apparatuses 432, including user interface components that facilitate inputting of a user, such as a keyboard, a mouse, a microphone, a touch display screen, a camera, and other input button and control.

The memory 450 may be a removable memory, a non-removable memory, or a combination thereof. Example hardware devices include a solid-state memory, a hard disk drive, an optical disc driver, or the like. The memory 450 may include one or more storage devices physically away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of this application is to include any other suitable type of memories.

In some embodiments, the memory 450 may store data to support various operations. Examples of the data include a program, a module, and a data structure, or a subset or a superset thereof, which are described below by using examples.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Example network interfaces 420 include: Bluetooth, wireless compatible authentication (WiFi), a universal serial bus (USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the interaction processing apparatus 455 for an information flow provided in the embodiments of this application may be implemented in a form of software. FIG. 3 shows an interaction processing apparatus 455 for an information flow stored on the memory 450, which may be software in the form of a program, a plug-in, or the like, and includes the following software modules: an information flow framework layer 4551, an interaction layer 4552, and a search layer 4553 (the search layer 4553 may be optional in one embodiment). The modules are logical, and therefore, can be combined arbitrarily or further divided according to functions implemented. The following describes functions of the modules.

Application examples of the information flow framework layer 4551, the interaction layer 4552, and the search layer 4553 in the interaction processing device 455 for an information flow in the terminal 400 is described below by using the first application program 500 and the second application program 600 run on the terminal 400 as an example.

First, the first application program 500 and the second application program 600 are described.

The first application program 500 may be a related application (APP) program based on the information flow such as a social network client that displays a social dynamic information flow of the user, or a news client that displays a news information flow in which the user is interested. The second application program 600 may be a client with an interaction function such as a mini program (which, for example, may be a mini program with a game function, that is, a mini game, or certainly, may be a mini program with another function, for example, a shopping mini program) or a live stream client.

Forms of the first application program 500 and the second application program 600 may be diverse.

For example, both the first application program 500 and the second application program 600 may be native APPs of the terminal, that is, an application program that can be run only after being downloaded and installed on the terminal 400. The interaction region can be inserted into an information flow of the first application program 500 to carry an interaction function of the second application program 600, so that the interaction function of the second application program 600 can be used without leaving a view of the first application program 500.

In another example, the first application program 500 may be a native APP, and the second application program 600 may be a mini program. The first application program 500 may download the second application program 600 automatically or according to a user instruction. The interaction region is inserted into an information flow of the first application program 500 to carry an interaction function of the second application program 600, so that the interaction function of the second application program 600 can be used without leaving a view of the first application program 500.

Application examples of the information flow framework layer 4551, the interaction layer 4552, and the search layer 4553 are described by still using the first application program 500 and the second application program 600 as an example.

Figure 4A:
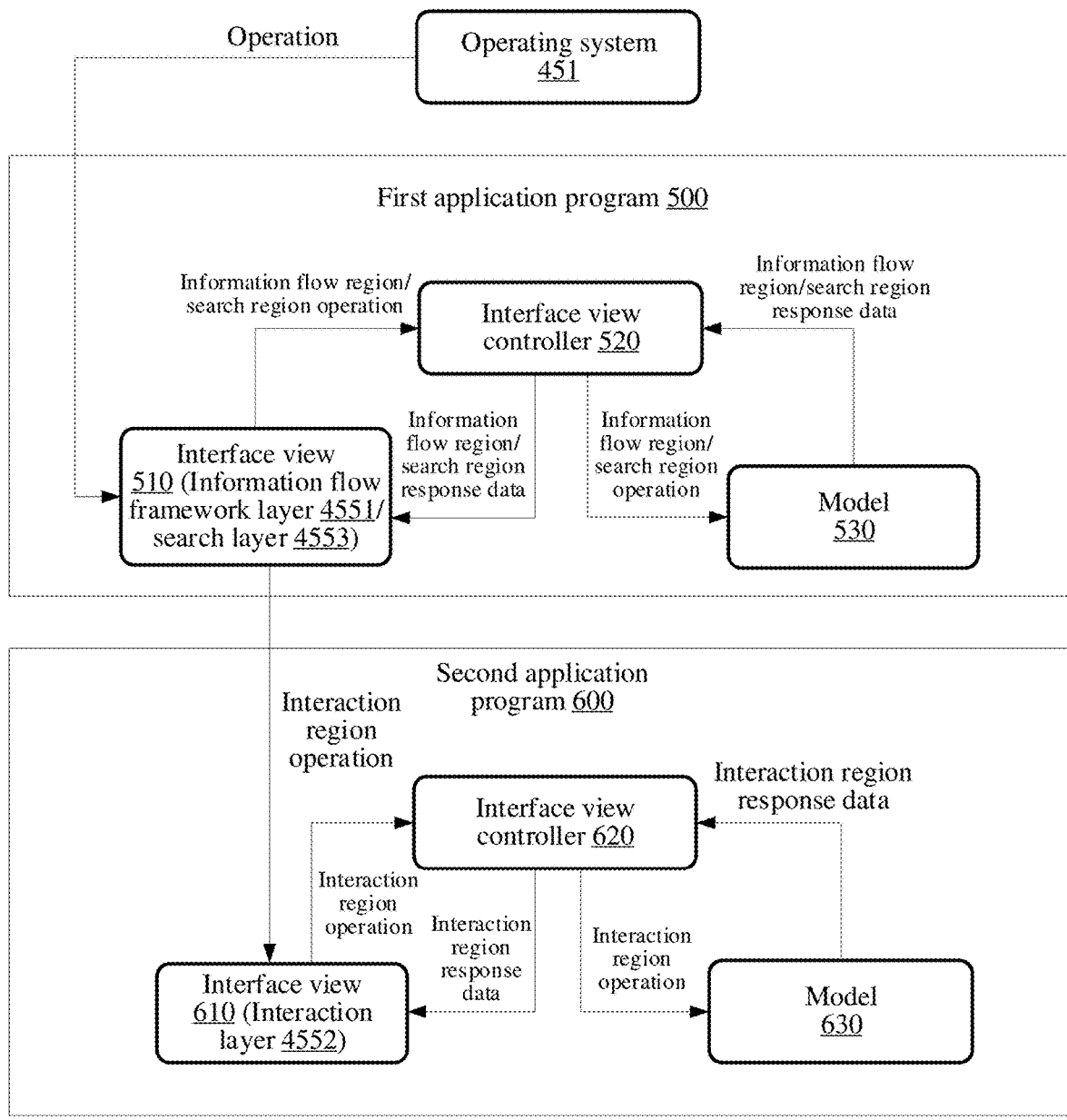
FIG. 4A and FIG. 4B are schematic architectural diagrams of a first application program and a second application program run on a terminal according to an embodiment of this application.

In some embodiments, FIG. 4A is a schematic architectural diagram of the first application program 500 and the second application program 600 run on the terminal 400 according to an embodiment of this application. The information flow framework layer 4551 and the search layer 4553 may be implemented as subviews in an interface view 510 of the first application program 500, and the interaction layer 4552 may be implemented as a subview in an interface view 610 of the second application program 600. The information flow framework layer 4551 inserts a transparent region for avoiding an interaction region loaded by the interaction layer 4552 between information in the information flow region, so that the interaction region loaded by the interaction layer 4552 can be displayed through the transparent region.

An operating system 451 transmits an operation (for example, a touch operation performed by the user on a screen of the terminal 400) acquired from an input processing module 454 to the interface view 510 in a form of an event. If an operation position is in the information flow region/search region, then the operation is an information flow region/search region operation. The information flow framework layer 4551/search layer 4553 in the interface view 510 transmits the information flow region/search region operation to a model 530 through an interface view controller 520. The information flow region/search region response data is calculated by the model 530 and returned to the information flow framework layer 4551/search layer 4553, to update and display the information flow region/search region.

If the operation position is located in the transparent region, because the transparent region is provided for display of the interaction region, the operation is an interaction region operation. The information flow framework layer 4551 in the interface view 510 transmits the interaction region operation to the interface view 610 of the second application program 600. The interaction layer 4552 in the interface view 610 transmits the interaction region operation to the model 630 through the interface view controller 620. Interaction region response data is calculated by the model 630 and returned to the interaction layer 4552, to cause the interaction layer 4552 to update and display the interaction region.

Figure 4B:
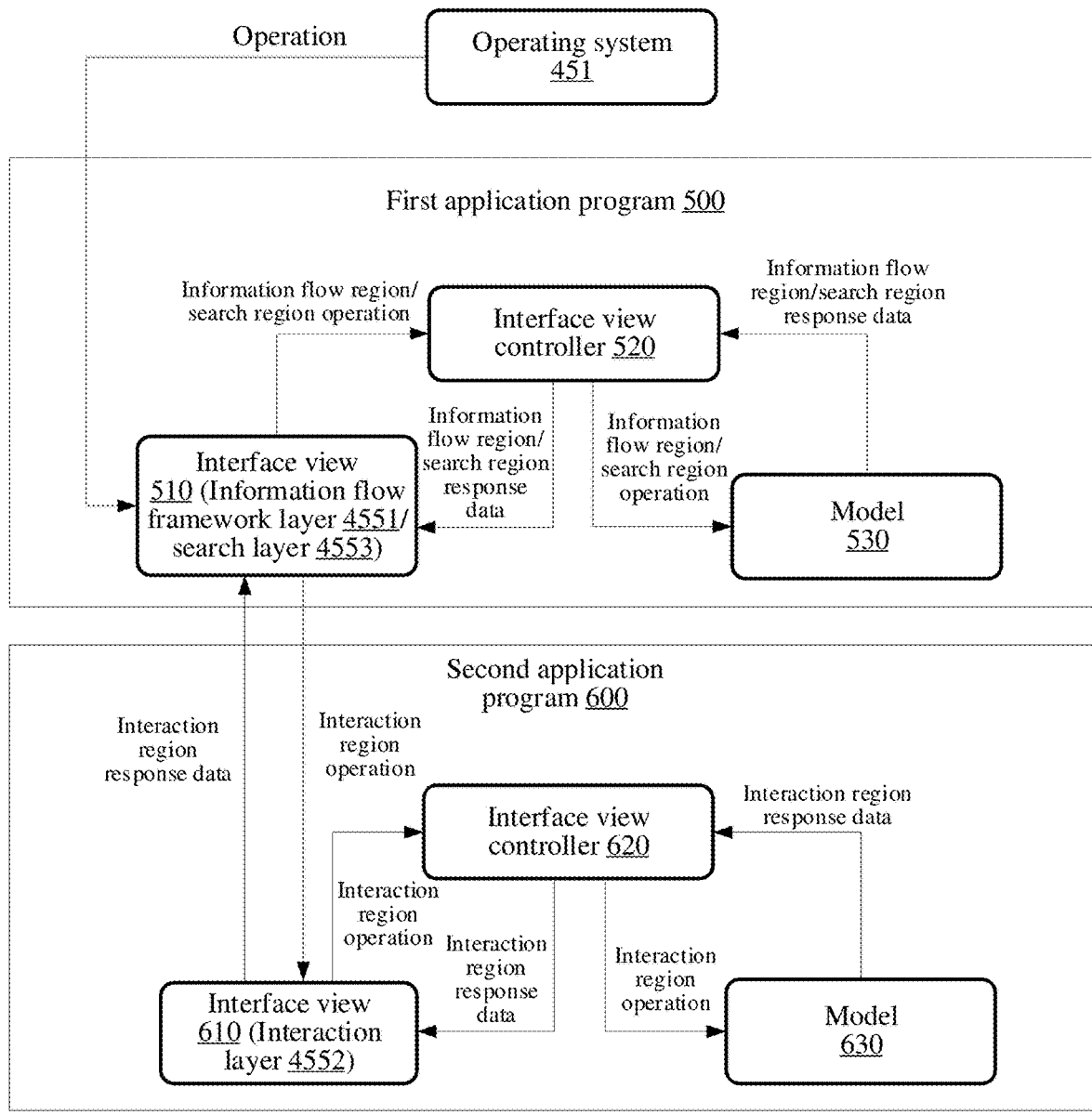

In some other embodiments, FIG. 4B is a schematic architectural diagram of the first application program 500 and the second application program 600 run on the terminal 400 according to an embodiment of this application. The information flow framework layer 4551 and the search layer 4553 may be implemented as subviews in an interface view 510 of the first application program 500, and the information flow framework layer 4551 inserts an interaction region between information of the information flow displayed in the information flow region, that is, both the interaction region and the information flow region are loaded and controlled for display by the information flow framework layer 4551. The interaction layer 4552 may be implemented as an interface of the second application program 600 and is not responsible for display control of the interaction region.

An operating system 451 transmits an operation (for example, a touch operation performed by the user on a screen of the terminal 400) acquired from an input processing module 454 to the interface view 510 in a form of an event. If an operation position is in the information flow region/search region, then the operation is an information flow region/search region operation. The information flow framework layer 4551/search layer 4553 in the interface view 510 transmits the information flow region/search region operation to a model 530 through an interface view controller 520. The information flow region/search region response data is calculated by the model 530 and returned to the information flow framework layer 4551/search layer 4553, to update and display the information flow region/search region.

If the operation position is located in the interaction region, then the operation is an interaction region operation. The information flow framework layer 4551 in the interface view 510 transmits the interaction region operation to the interface view 610 of the second application program 600. The interaction layer 4552 in the interface view 610 transmits the interaction region operation to the model 630 through the interface view controller 620. Interaction region response data is calculated by the model 630 and returned to the interaction layer 4552, and is further returned by the interaction layer 4552 to the information flow framework layer 4551. The information flow framework layer 4551 updates and displays the interaction region.

The interaction processing method for an information flow provided in the embodiments of this application is described with reference to the Example applications and implementations of the terminal 400 provided in the embodiments of this application.

In some embodiments, information flow is displayed in an information flow region; at least one interaction region is inserted between information of the information flow, and at least one interaction material is display in an interaction region; and the information in the information flow and a position of the interaction region in an information flow display interface are updated in response to a movement operation on the information flow, and an interaction process in the interaction region is displayed when the position of the interaction region reaches a set position, the interaction process including a process in which the at least one interaction material changes with an interaction operation.

Figure 5:
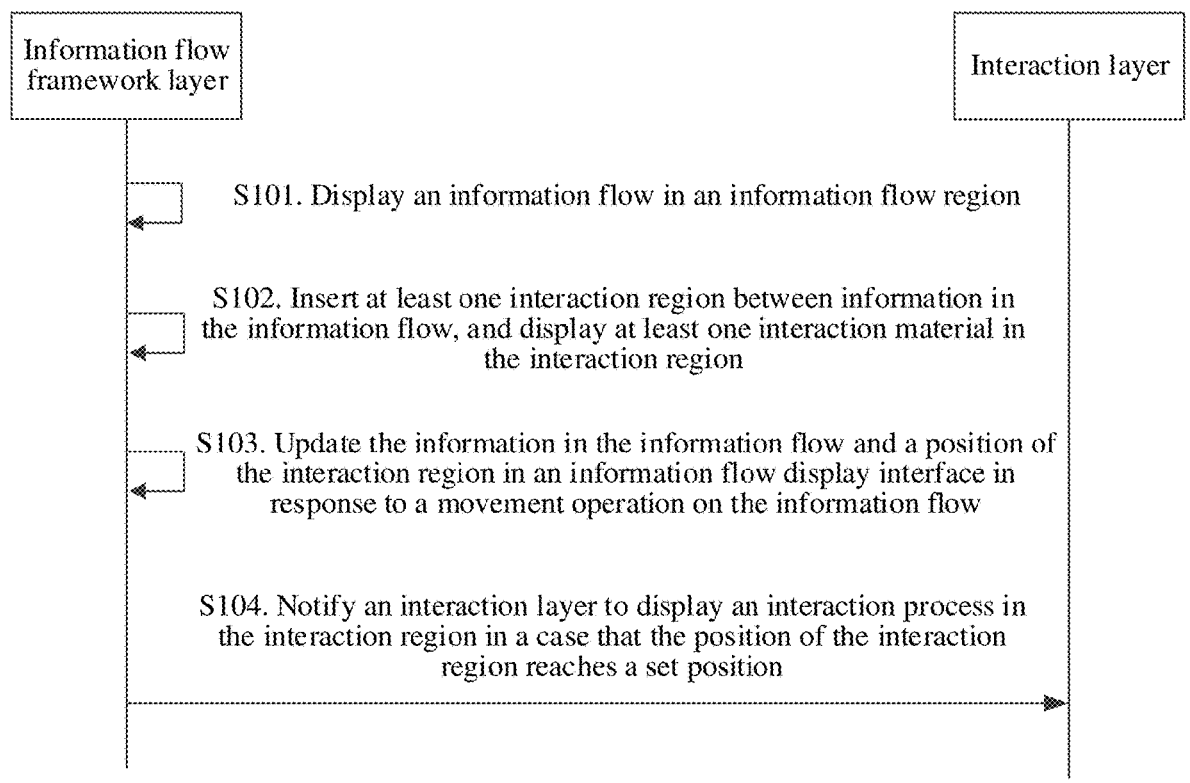
FIG. 5 is a schematic flowchart of an interaction processing method for an information flow according to an embodiment of this application.

FIG. 5 is a schematic flowchart of an interaction processing method for an information flow according to an embodiment of this application, which is described with reference to steps shown in FIG. 5.

Step S101: An information flow framework layer displays an information flow in an information flow region.

In some embodiments, the information flow is displayed in the information flow region by the information flow framework layer, and the information flow may be pre-cached or obtained online. For example, a terminal device may obtain a locally stored information flow. Alternatively, the terminal device may initiate an information request to a server according to a user account in a login state in an application program. The server searches for a user portrait corresponding to the user account according to the received information request, sifts an information flow corresponding to the user portrait in a database, and transmits the sifted information flow to the terminal device. After the information flow is obtained, the information flow can be displayed in a set information flow region in an interface.

In an example, the information flow framework layer displays the information flow in the set information flow region, and the information flow can be pre-cached or obtained online.

In an example following FIG. 4A or FIG. 4B, in response to an information flow display operation, the information flow framework layer 4551 transmits the operation to the interface view controller 520 in the form of an event, the interface view controller 520 transmits the information flow display operation to the model 530, and the model 530 determines a to-be-displayed information flow according to the information flow display operation. The model 530 transmits the to-be-displayed information flow to the information flow framework layer 4551 through the interface view controller 520, so that the information flow framework layer 4551 displays the information flow in the information flow region.

Step S102: The information flow framework layer inserts at least one interaction region between information in the information flow, and displays at least one interaction material in the interaction region.

In an example, at least one interaction region is inserted between the information of the information flow by the information flow framework layer, and at least one interaction material is displayed in the interaction region. A timing of the insertion may be varied in this embodiment of this application, and may be set according to an actual application scenario. For example, an interaction region is inserted every K pieces of information in the information flow, where K is an integer greater than 0. The interaction materials are various visual objects that participate in a man-machine interaction operation in an interaction process, and the interaction materials can have a position and/or a display effect changed according to the man-machine interaction operation.

In some embodiments, at least one interaction region is inserted between the information in the information flow, and at least one interaction material is displayed in the interaction region. The information flow framework layer loads a transparent region between the information in the information flow region for avoiding the interaction region in the interaction region, so that at least one interaction region loaded by the interaction layer is displayed through the transparent region. The interaction layer displays the at least one interaction material in the loaded interaction region.

In some embodiments, a transparent region for avoiding the interaction region is loaded between the information in the information flow region, at least one of the at least one interaction region being displayed through the transparent region.

In an example, the interaction region is formed by loading of the interaction layer, and the information flow region carrying the information flow is formed by the information flow framework layer. That is, the interaction region and the information flow region respectively belong to different view layers, that is, the interaction region is a region in the interaction layer, and the information flow region is a region in the information flow framework layer.

In an example following FIG. 4A, the interface view controller 520 controls the information flow framework layer 4551 to load a transparent region for avoiding the interaction region between the information in the information flow region; the interface view controller 620 controls at least one of the at least one interaction region loaded by the interaction layer 4552 to be displayed through the transparent region; and the interface view controller 620 controls the interaction layer 4552 to display at least one interaction material in the loaded interaction region.

The interface view controllers corresponding to the information flow framework layer 4551 and the interaction layer 4552 are different. The interface view controller corresponding to the information flow framework layer 4551 is the interface view controller 520 of the first application program 500. The interface view controller corresponding to the interaction layer 4552 is the interface view controller of the second application program 600.

Figure 10A:
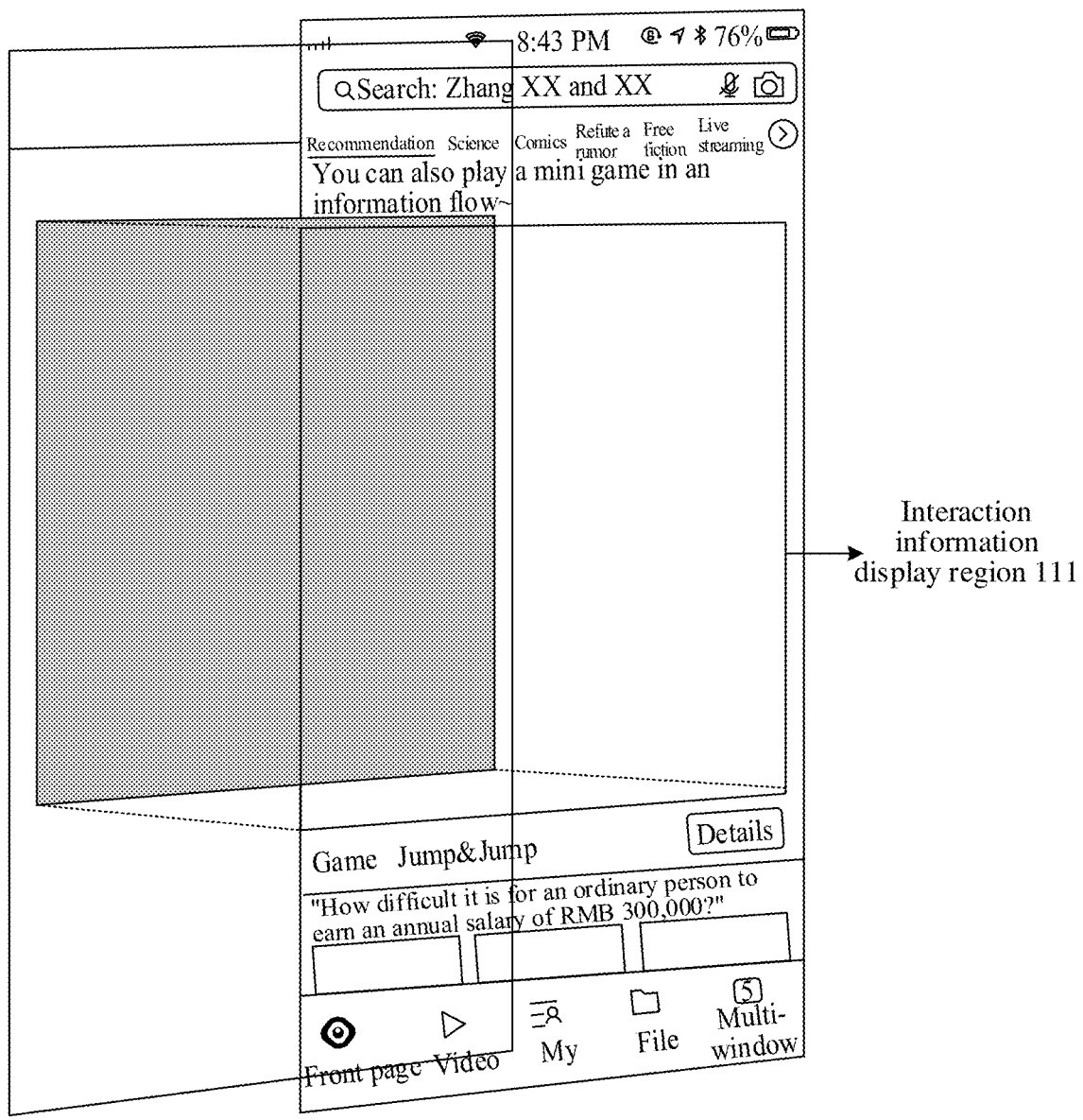
FIG. 10A and FIG. 10B are schematic diagrams of a principle according to an embodiment of this application.

For example, in FIG. 10A, the information flow framework layer hollows out an interaction information display region 111 (that is, the foregoing interaction region) (that is, sets the interaction information display region 111 to be transparent), and displays web page content loaded by the interaction layer through the hollowed-out region.

In this embodiment of this application, it may be unnecessary to divide an interaction material in the interaction region and then display the divided interaction material in the interaction region, which can greatly ensure the integrity of content displayed in the interaction region.

In some other embodiments, the information flow framework layer loads the interaction region between the information in the information flow region; and the interaction layer transmits at least one interaction material corresponding to the interaction region to the information flow framework layer, so that the information flow framework layer fills the at least one interaction material into the interaction region for adaptive display.

In an example, the interaction region and the information flow region are both formed by loading of the information flow framework layer. That is, the interaction region and the information flow region belong to a same view layer, that is, the interaction region and the information flow region are different regions in the information flow framework layer.

In an example following FIG. 4B, the interface view controller 520 controls the information flow framework layer 4551 to load the interaction region between the information in the information flow region; and the interaction layer 4552 transmits at least one interaction material corresponding to the interaction region to the information flow framework layer 4551, so that the information flow framework layer 4551 fills the at least one interaction material into the interaction region for adaptive display.

For example, the interaction layer adjusts a size of at least one interaction material in the interaction region in proportion to a size of the interaction region, and transmits the adjusted at least one interaction material to the information flow framework layer, so that the information flow framework layer fills the adjusted at least one interaction material into a corresponding position of the interaction region, and fills a color block into a blank region of the interaction region that is not filled with the interaction material, or stretches an element corresponding to the blank region of the interaction region that is not filled with the material to fill up the blank region.

Figure 10B:
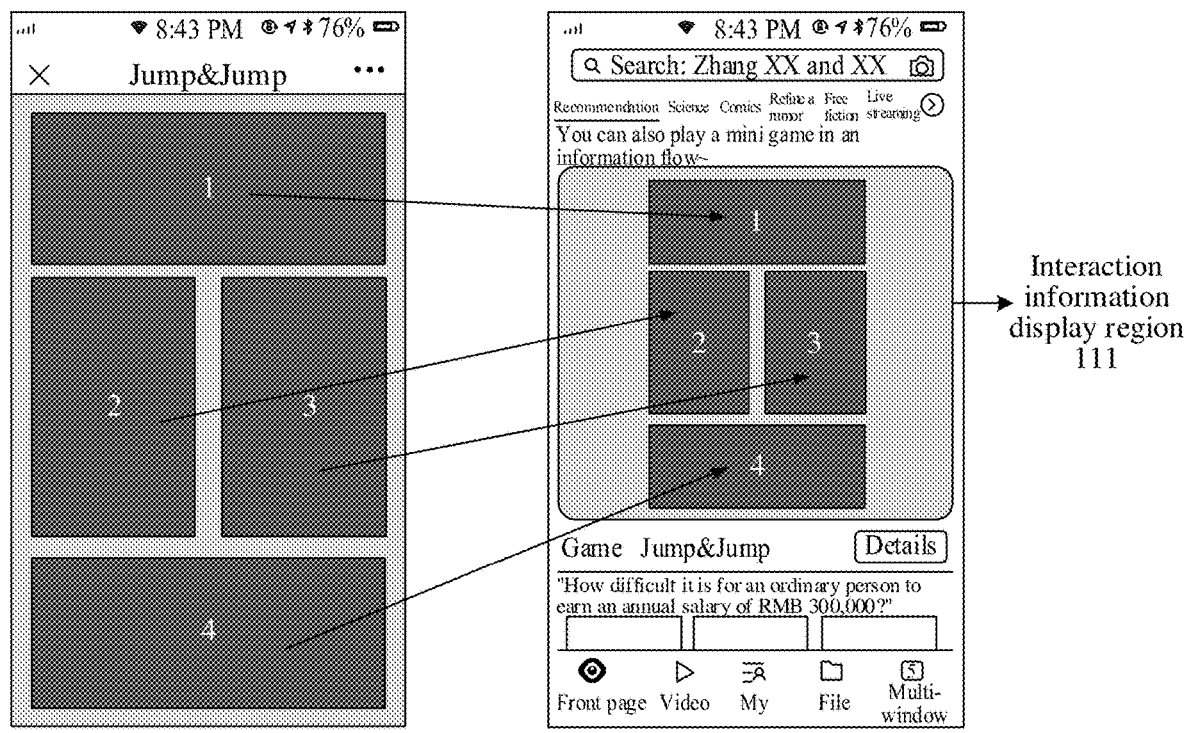

Using an example in which information displayed in the interaction region is an H5 mini game, in FIG. 10B, the interaction layer marks an interaction material of the H5 mini game, correspondingly reorganizes the interaction material according to a size of the interaction information display region 111 (that is, the foregoing interaction region), and transmits the reorganized interaction material to the information flow framework layer. In this way, the information flow framework layer can display all the interaction materials of the H5 mini game in the interaction information display region 111.

In an example, there are two implementations for the information flow framework layer to display all the received interaction materials of the H5 mini game in the interaction information display region 111, which are: ① Scale down a plurality of interaction materials of the H5 mini game into the interaction information display region 111, and fill other vacant parts of the interaction information display region 111 with ordinary color blocks. ② Determine stretchable content, such as a bottom background or a top operation bar, in the interaction information display region 111. The stretchable content in the interaction information display region 111 can horizontally or vertically fill the interaction information display region 111 according to a size of the interaction information display region 111. For non-stretchable content such as text, an icon, or a button, after the stretchable content fills the interaction information display region 111, the non-stretchable content is accordingly matched to a corresponding position of the interaction information display region 111, so that the interaction material and the information flow framework layer are organically combined, which improves the visual coherence when the user browses the information flow.

Step S103: The information flow framework layer updates the information in the information flow and a position of the interaction region in an information flow display interface in response to a movement operation on the information flow.

In some embodiments, the information in the information flow and the position of the interaction region in the information flow display interface are updated by the information flow framework layer in response to the movement operation on the information flow.

In some embodiments, the updating the information in the information flow and a position of the interaction region in an information flow display interface in response to a movement operation on the information flow includes updating positions of the information in the information flow according to a direction and a magnitude of the movement operation; and synchronously updating the position of the interaction region according to the direction and the magnitude of the movement operation. The interaction region moves with the information in the information flow, and the interaction region is continuously displayed through the transparent region. It can be ensured that when the user browses the information flow, the interaction region loaded by the interaction layer can always be displayed through the transparent region in the information flow framework layer.

In some embodiments, the information flow framework layer updates the position of the information in the information flow according to the direction and the magnitude of the movement operation, and transmits the direction and the magnitude of the movement operation to the interaction layer, so that the interaction layer can synchronously update the position of the interaction region according to the direction and the magnitude of the movement operation, and the interaction region can be continuously displayed through the transparent region.

In an example following FIG. 4A, the operating system 451 transmits an operation (including parameters of a direction and a magnitude) to the information flow framework layer 4551 in the form of an event. The information flow framework layer 4551 transmits the operation to the model 530 through the interface view controller 520. The model 530 calculates information flow region response data (including indicating the position of the information in the information flow in the information flow display interface (that is, a height of the information on a screen) and the display effect), and returns the information flow region response data to the information flow framework layer 4551 through the interface view controller 520. The information flow framework layer 4551 refreshes the information flow region according to the information flow region response data, that is, updates the position of the information in the information flow. The information flow framework layer 4551 transmits the operation to the interaction layer 4552. The interaction layer 4552 transmits the operation to the model 630 corresponding to the interaction layer 4552 through the interface view controller 620, the model 630 corresponding to the interaction layer 4552 calculates interaction region response data (including indicating the position of the interaction region in the information flow display interface (that is, the height of the interaction region on the screen) and the display effect), and returns the interaction region response data to the interaction layer 4552 through the interface view controller 620. The interaction layer 4552 updates the position of the interaction region according to the interaction region response data.

In this embodiment of this application, the information flow framework layer and the interaction layer respectively control the information in the information flow and the position of the interaction region according to the movement operation, which can ensure that the interaction region loaded by the interaction layer can always be displayed through the transparent region in the information flow framework layer when the user browses the information flow, so that when the user browses the information flow, the problem that the interaction region cannot be displayed because the interaction region cannot keep up with a movement speed of the transparent region is avoided, thereby improving the visual coherence when the user browses the information flow.

In some embodiments, the information flow framework layer updates the position of the information in the information flow according to the direction and the magnitude of the movement operation, and synchronously updates the position of the interaction region.

In an example following FIG. 4B, the operating system 451 transmits an operation (including parameters of a direction and a magnitude) to the information flow framework layer 4551 in the form of an event; The information flow framework layer 4551 transmits the operation to the model 530 through the interface view controller 520. The model 530 calculates information flow region response data (including indicating the position of the information in the information flow in the information flow display interface (that is, a height of the information on a screen) and the display effect), and the interaction region response data (including indicating the position of the interaction region in the information flow display interface (that is, a height of the interaction region on the screen) and the display effect), and returns the information flow region response data to the information flow framework layer 4551 through the interface view controller 520. The information flow framework layer 4551 updates positions of the information and the interaction region in the information flow according to the information flow region response data and the interaction region response data.

In this embodiment of this application, the information flow framework layer can directly update the positions of the information and the interaction region in the information flow according to the movement operation, which enhances a speed of updating the information and the position of the interaction region in the information flow, so that there is a high degree of consistency between the operation of the user and the movement of the information flow.

Step S104: The information flow framework layer notifies the interaction layer to display an interaction process in the interaction region when the position of the interaction region reaches a set position.

In some embodiments, a first notification is transmitted to the interaction region by the information flow framework layer when the position of the interaction region reaches the set position, the first notification being used for instructing the interaction layer to display an interaction process in the interaction region. The interaction process is displayed in the interaction region by the interaction layer.

In an example, when the position of the interaction region reaches the set position, the interaction process is displayed in the interaction region. The interaction process is a process in which at least one interaction material changes with the interaction operation, and for example, may be a process in which at least one interaction material changes a display form with an interaction operation. The interaction operation may be an operation (that is, an operation acquired by the operating system 451 on the terminal 400 from the input processing module 454) of a local terminal, or may be an operation of a non-local terminal.

A relationship between the interaction material and the interaction process is described below in detail with two examples.

Using an example in which information displayed in the interaction region is a mini game (that is, the second application program 600 is a mini game), a game interface is displayed in the interaction region, and the interaction material may be a game material, such as a game character or a game prop, in the game interface. An interaction process displayed in the interaction region may be as follows: An interaction material changes a display form with an interaction operation (such as a jumping operation, an advancing operation, or an operation of using a prop) of a player such as jumping or running of a game character. The interaction operation of the player may be an interaction operation of the local terminal.

Using an example in which information displayed in the interaction region is a live stream (that is, the second application program 600 is a live stream client), a live stream room in live streaming is displayed in the interaction region, and the interaction material may be a material such as a gift, a like, or a comment in a live stream region, a Like region, a Comment region, or a Gift region in the live stream room. The interaction process displayed in the interaction region may be as follows: The interaction material changes a display form, such as a gift animation, a like animation, or scrolling display of a comment, with an interaction operation (such as a like operation, a comment operation, or a gift-giving operation) of a live stream viewer. An interaction operation of the live stream viewer room may be an interaction operation of the local terminal or an interaction operation of a terminal of another viewer in the live stream room.

As an alternative to step S104, when receiving an interaction trigger operation on the interaction region, the information flow framework layer transmits the interaction trigger operation to the interaction layer, and displays an interaction process in the interaction region, so that the interaction process can be displayed in the interaction region without requiring the position of the interaction region to reach the set position, which improves the diversity of the triggering of the interaction process and the flexibility of interaction processing.

In an example following FIG. 4A or FIG. 4B, the operating system 451 transmits an interaction trigger operation (including parameters such as a position and a type of the interaction trigger operation) to the information flow framework layer 4551 in the form of an event. When a position of the interaction trigger operation is located at a position outside the interaction region in the information flow framework layer 4551, it is determined that the foregoing interaction trigger operation is an operation on the information flow. The information flow framework layer 4551 transmits the interaction trigger operation to the model 530 through the interface view controller 520. The model 530 calculates information flow region response data (including indicating a display form of information in the information flow, for example, displaying details of the information, or comments, likes, and forwards for the information), and returns the information flow region response data to the information flow framework layer 4551 through the interface view controller 520. The information flow framework layer 4551 refreshes the information flow region according to the information flow region response data, that is, updates the display form of the information in the information flow.

As another example following FIG. 4A, the operating system 451 transmits an interaction trigger operation (including parameters of a position and a type of the interaction trigger operation) to the information flow framework layer 4551 in the form of an event. When a position of the interaction trigger operation is located at a position (for example, the position of the interaction trigger operation is located in a region of a start button in the interaction region) in the interaction region in the information flow framework layer 4551, it is determined that the foregoing interaction trigger operation is an operation on the interaction region. The information flow framework layer 4551 transmits the interaction trigger operation to the interaction layer 4552. The interaction layer 4552 transmits the interaction trigger operation to the model 630 corresponding to the interaction layer 4552 through the interface view controller 620. The model 630 corresponding to the interaction layer 4552 calculates interaction region response data (including a manner in which the interaction material responds to an operation, for example, indicating the position, the display effect, or the like of the interaction material), and returns the interaction region response data to the interaction layer 4552 through the interface view controller 620. The interaction layer 4552 refreshes the interaction region according to the interaction region response data, that is, displays the interaction process in the interaction region.

As still another example following FIG. 4B, the operating system 451 transmits an interaction trigger operation (including parameters of a position and a type of the interaction trigger operation) to the information flow framework layer 4551 in the form of an event; When a position of the interaction trigger operation is located at a position (for example, the position of the interaction trigger operation is located in a region of a start button in the interaction region) in the interaction region in the information flow framework layer 4551, it is determined that the foregoing interaction trigger operation is an operation on the interaction region. The information flow framework layer 4551 transmits the interaction operation to the interaction layer 4552. The interaction layer 4552 transmits the interaction trigger operation to the model 630 corresponding to the interaction layer 4552 through the interface view controller 620. The model 630 corresponding to the interaction layer 4552 calculates interaction region response data (including a manner in which the interaction material responds to an operation, for example indicating the position, the display effect, or the like of the interaction material), and returns the interaction region response data to the interaction layer 4552 through the interface view controller 620. The interaction layer 4552 transmits the interaction region response data to the information flow framework layer 4551. The information flow framework layer 4551 refreshes the interaction region according to the interaction region response data, that is, displays the interaction process in the interaction region.

In this embodiment of this application, when the position of the interaction region does not reach the set position, the interaction process can still be displayed in the interaction region according to a trigger operation of the user, which improves the diversity of the triggering of the interaction process and can avoid the problem that the application program fails to identify the position of the interaction region in time and consequently fails to display the interaction process in time, thereby improving the interaction experience of the user.

An example embodiment of displaying the interaction process in the interaction region is described below.

In some embodiments, the interaction layer receives an interaction operation on the interaction region transmitted by the information flow framework layer, and generate interaction response data in response to the interaction operation. The interaction layer displays the interaction process in the interaction region according to the interaction response data.

In some embodiments, the interaction response data is generated in response to the interaction operation on the interaction region; and the interaction process is displayed in the interaction region according to the interaction response data.

In an example following FIG. 4A, the operating system 451 transmits an operation (including parameters of a position and a type of the operation) to the information flow framework layer 4551 in the form of an event. When the operation position is located at a position outside the interaction region in the information flow framework layer 4551, it is determined that the foregoing operation is an operation on the information flow. The information flow framework layer 4551 transmits the operation to the model 530 through the interface view controller 520. The model 530 calculates information flow region response data (including indicating a display form of information in the information flow, for example, displaying details of the information, or comments, likes, and forwards for the information), and returns the information flow region response data to the information flow framework layer 4551 through the interface view controller 520. The information flow framework layer 4551 refreshes the information flow region according to the information flow region response data, that is, updates the display form of the information in the information flow.

As another example following FIG. 4A, the operating system 451 transmits an operation (including parameters of a position and a type of the operation) to the information flow framework layer 4551 in the form of an event. When the operation position is located at a position in the interaction region in the information flow framework layer 4551, it is determined that the foregoing operation is an interaction operation on the interaction region. The information flow framework layer 4551 transmits the interaction operation to the interaction layer 4552. The interaction layer 4552 transmits the interaction operation to the model 630 corresponding to the interaction layer 4552 through the interface view controller 620. The model 630 corresponding to the interaction layer 4552 calculates interaction region response data (that is, the foregoing interaction response data, including a manner in which the interaction material responds to an operation, for example, indicating the position, the display effect, or the like of the interaction material), and returns the interaction region response data to the interaction layer 4552 through the interface view controller 620. The interaction layer 4552 refreshes the interaction region according to the interaction region response data, that is, displays the interaction process in the interaction region. A quantity of transmissions of the interaction region response data is reduced, thereby improving the interaction efficiency.

In some embodiments, the interaction operation on the interaction region is transmitted to the interaction layer by the information flow framework layer, interaction response data determined by the interaction layer according to the interaction operation is received by the information flow framework layer, and the interaction process in the interaction region is displayed according to the interaction response data.

In an example following FIG. 4B, the operating system 451 transmits an operation (including parameters of a position and a type of the operation) to the information flow framework layer 4551 in the form of an event. When an operation position is located at a position outside the interaction region in the information flow framework layer 4551, it is determined that the foregoing operation is an operation on the information flow; The information flow framework layer 4551 transmits the operation to the model 530 through the interface view controller 520. The model 530 calculates information flow region response data (including indicating a display form of information in the information flow, for example, displaying details of the information, or comments, likes, and forwards for the information), and returns the information flow region response data to the information flow framework layer 4551 through the interface view controller 520. The information flow framework layer 4551 refreshes the information flow region according to the information flow region response data, that is, updates the display form of the information in the information flow.

As another example following FIG. 4B, the operating system 451 transmits an operation (including parameters of a position and a type of the operation) to the information flow framework layer 4551 in the form of an event. When an operation position is located at a position in the interaction region in the information flow framework layer 4551, it is determined that the foregoing operation is an interaction operation on the interaction region; The information flow framework layer 4551 transmits the interaction operation to the interaction layer 4552. The interaction layer 4552 transmits the interaction operation to the model 630 corresponding to the interaction layer 4552 through the interface view controller 620. The model 630 corresponding to the interaction layer 4552 calculates interaction region response data (including a manner in which the interaction material responds to an operation, for example, indicating the position, the display effect, or the like of the interaction material), returns the interaction region response data to the interaction layer 4552 through the interface view controller 620. The interaction layer 4552 transmits the interaction region response data to the information flow framework layer 4551, and the information flow framework layer 4551 refreshes the interaction region according to the interaction region response data, that is, displays the interaction process in the interaction region.

In this embodiment of this application, the information frame layer can directly display the interaction process in the interaction region according to the interaction response data, which enhances a response speed of the interaction region in the interaction process, so that there is a high degree of consistency between the interaction operation of the user and displaying the interaction process.

Figure 6:
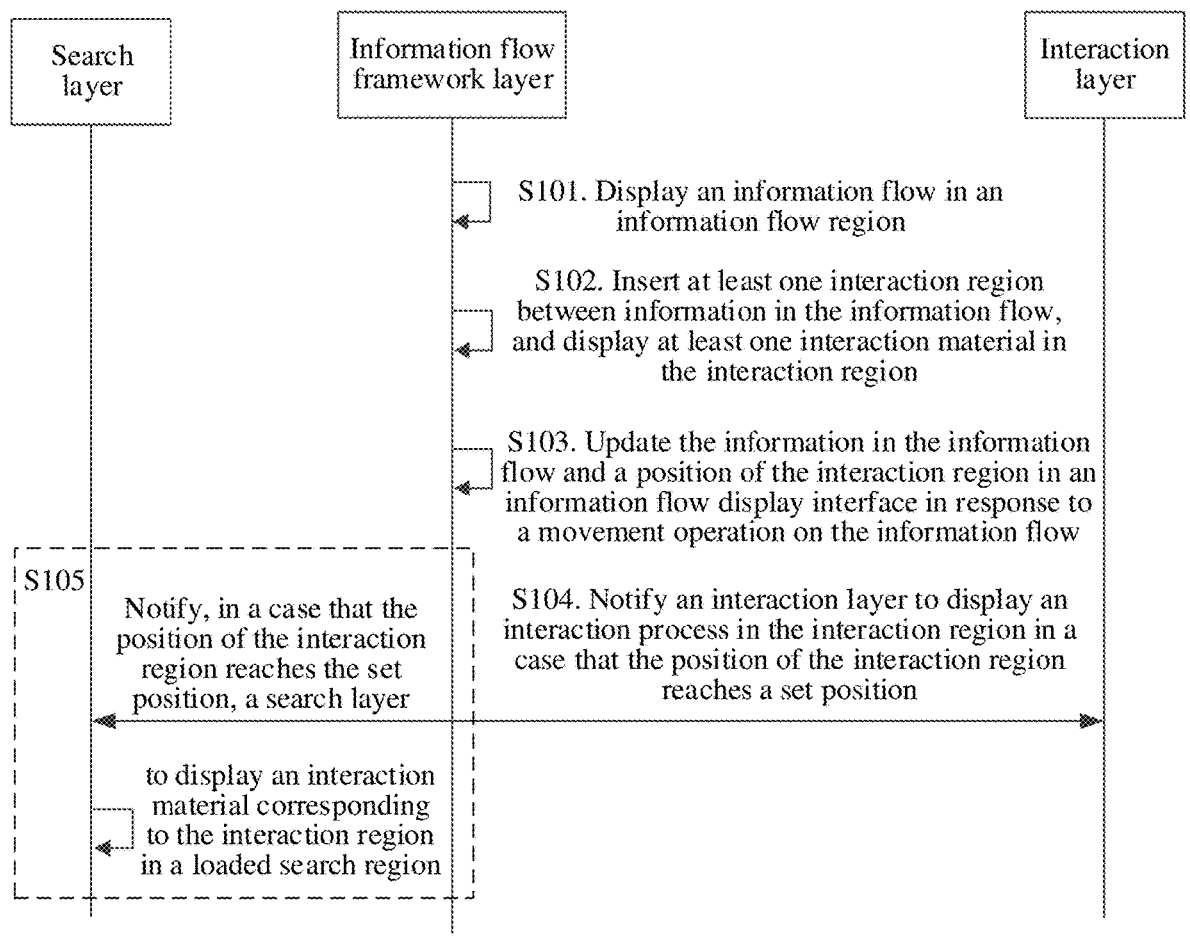
FIG. 6 is a schematic flowchart of an interaction processing method for an information flow according to an embodiment of this application.

In some embodiments, FIG. 6 is a schematic flowchart of an interaction processing method for an information flow according to an embodiment of this application. Based on FIG. 5, after step S104, the method further includes step S105.

Step S105: When the position of the interaction region reaches the set position, the information flow framework layer notifies a search layer, to cause the search layer to display an interaction material corresponding to the interaction region in a loaded search region.

In an example, when the position of the interaction region reaches the set position, the information flow framework layer transmits a second notification to the search layer, the second notification being used for instructing the search layer to display the interaction material corresponding to the interaction region in the loaded search region. The interaction materials are various visual objects that participate in man-machine interaction in the interaction process and can have a position and/or a display effect changed according to a man-machine interaction operation, for example, game prompt text or operation prompt content.

In an example following FIG. 4A or FIG. 4B, when the position of the interaction region reaches the set position, the information flow framework layer 4551 notifies the search layer 4553. The search layer 4553 notifies the model 530 through the interface view controller 520. The model 530 calculates search region response data (including a display form indicating the interaction material in the search region), and transmits the search region response data to the search layer 4553 through the interface view controller 520. The search layer 4553 refreshes the search region according to the search region response data, that is, displays the interaction material corresponding to the interaction region in the search region.

In this embodiment of this application, the search layer is instructed to display the interaction material corresponding to the interaction region in the loaded search region, which can not only guide the user to perform an interaction operation when the user browses the information flow, to improve the monetization rate of information in the information flow, but also can prompt the user during the interaction operation of the user, to improve the interaction experience of the user.

In some embodiments, after step S104, the method further includes step S106 and step S107.

Step S106: Suspend displaying the interaction process in the interaction region, and record progress data corresponding to the interaction process when the position of the interaction region leaves the set position.

In an example, when information displayed in the interaction region is an H5 mini game, the progress data may be data of the last game played by the user such as a game score, a position, and a game level. When information displayed in the interaction region is a video page, the progress data may be data of the last video watched by the user such as a video name and a video viewing progress or the like.

In some embodiments, when the position of the interaction region leaves the set position, the information flow framework layer notifies the interaction layer, to cause the interaction layer to suspend displaying the interaction process in the interaction region, and records the progress data corresponding to the interaction process.

In an example following FIG. 4A, when the position of the interaction region leaves the set position, the information flow framework layer 4551 notifies the interaction layer 4552, to cause the interaction layer 4552 to suspend displaying the interaction process in the interaction region, and notifies the model 630 corresponding to the interaction layer 4552 through the interface view controller 620. The progress data corresponding to the interaction process is recorded by the model 630 corresponding to the interaction layer 4552.

In some other embodiments, when the position of the interaction region leaves the set position, the information flow framework layer suspends displaying the interaction process in the interaction region, and records the progress data corresponding to the interaction process.

In an example following FIG. 4B, when the position of the interaction region leaves the set position, the information flow framework layer 4551 suspends displaying the interaction process in the interaction region, and notifies the model 530 through the interface view controller 520. The progress data corresponding to the interaction process is recorded by the model 530.

As an alternative to step S106, when the position of the interaction region does not leave the set position and a suspending operation on the interaction region is received, displaying of the interaction process is suspended in the interaction region, and the progress data corresponding to the interaction process is recorded.

In an example, a process of suspending displaying the interaction process in the interaction region and recording the progress data corresponding to the interaction process may be similar to the foregoing solution and examples described throughout.

Step S107: Resume, according to the progress data, a progress of displaying the interaction process in the interaction region when the position of the interaction region reaches the set position again.

In some embodiments, when the position of the interaction region reaches the set position again, the interaction layer receives a resuming operation on the interaction region transmitted by the information flow framework layer, and generate interaction response data in response to the resuming operation. The interaction layer resumes, according to the interaction response data, a progress of displaying the interaction process in the interaction region.

In an example following FIG. 4A, the operating system 451 transmits the resuming operation to the information flow framework layer 4551 in the form of an event. The information flow framework layer 4551 transmits the resuming operation to the interaction layer 4552; The interaction layer 4552 transmits the resuming operation to the model 630 corresponding to the interaction layer 4552 through the interface view controller 620. The model 630 corresponding to the interaction layer 4552 calculates interaction region response data (including a manner in which the interaction material responds to an operation, for example, indicating the position, the display effect, or the like of the interaction material) according to the progress data, and returns the interaction region response data to the interaction layer 4552 through the interface view controller 620. The interaction layer 4552 refreshes the interaction region according to the interaction region response data, that is, resumes a progress of displaying the interaction process in the interaction region.

In some other embodiments, when the position of the interaction region reaches the set position again, the information flow framework layer transmits a resuming operation on the interaction region to the interaction layer, receives the interaction response data determined by the interaction layer according to the resuming operation, and resumes, according to the interaction response data, a progress of displaying the interaction process in the interaction region.

In an example following FIG. 4B, the operating system 451 transmits the resuming operation to the information flow framework layer 4551 in the form of an event. The information flow framework layer 4551 transmits the resuming operation to the interaction layer 4552; The interaction layer 4552 transmits the resuming operation to the model 630 corresponding to the interaction layer 4552 through the interface view controller 620. The model 630 corresponding to the interaction layer 4552 calculates interaction region response data (including a manner in which the interaction material responds to an operation, for example, indicating the position, the display effect, or the like of the interaction material) according to the progress data, and returns the interaction region response data to the interaction layer 4552 through the interface view controller 620. The interaction layer 4552 transmits the interaction region response data to the information flow framework layer 4551, and the information flow framework layer 4551 refreshes the interaction region according to the interaction region response data, that is, resumes a progress of displaying the interaction process in the interaction region.

As an alternative to step S107, when the position of the interaction region does not reach the set position, and the information flow framework layer receives an interaction trigger operation on the interaction region, a progress of displaying the interaction process in the interaction region is resumed according to the progress data.

In an example, a process of resuming, according to the progress data, a progress of displaying the interaction process in the interaction region may be similar to the foregoing solution or embodiment in one example.

In this embodiment of this application, progress data corresponding to a moment at which the position of the interaction region leaves the set position is recorded, so that when the interaction region is displayed again at the set position, the interaction process can be resumed according to the progress data corresponding to the moment at which the position of the interaction region leaves the set position, so as to ensure that the user can continuously interact, and improve the interaction experience of the user.

In some embodiments, after step S104, the method further includes step S108 and step S109.

Step S108: Clear, in response to an end operation on the application program, progress data corresponding to the interaction process.

In some embodiments, in response to an end operation on the application program, the information flow framework layer notifies the interaction layer, to cause the interaction layer to clear the progress data corresponding to the interaction process.

In an example following FIG. 4A, the operating system 451 transmits the end operation to the information flow framework layer 4551 in the form of an event. The information flow framework layer 4551 transmits the end operation to the interaction layer 4552. The interaction layer 4552 transmits the end operation to the model 630 corresponding to the interaction layer 4552 through the interface view controller 620, and the model 630 corresponding to the interaction layer 4552 clears the progress data of the corresponding interaction process.

In some other embodiments, in response to the end operation on the application program, the information flow framework layer clears the progress data corresponding to the interaction process.

In an example following FIG. 4B, the operating system 451 transmits the end operation to the information flow framework layer 4551 in the form of an event. The information flow framework layer 4551 transmits the end operation to the model 530 through the interface view controller 520, and the model 530 clears the progress data corresponding to the interaction process.

As an alternative to step S108, when running of the application program is not finished, and a clearing operation on the interaction region is received, interaction data corresponding to the interaction process is cleared.

In one example, a process of clearing the interaction data corresponding to the interaction process may be similar to a foregoing solution or embodiments in one example.

Step S109: Redisplay the interaction process in the interaction region when the application program is run again, and the position of the interaction region reaches the set position again.

In some embodiments, when the application program is run again, and the position of the interaction region reaches the set position again, the interaction layer receives the interaction operation on the interaction region transmitted by the information flow framework layer, and generates interaction response data in response to the interaction operation. The interaction layer displays the interaction process in the interaction region according to the interaction response data.

In an example following FIG. 4A, the operating system 451 transmits an operation (including parameters of a position and a type of the operation) to the information flow framework layer 4551 in the form of an event. The information flow framework layer 4551 transmits the interaction operation to the interaction layer 4552. The interaction layer 4552 transmits the interaction operation to the model 630 corresponding to the interaction layer 4552 through the interface view controller 620. The model 630 corresponding to the interaction layer 4552 calculates interaction region response data (including a manner in which the interaction material responds to an operation, for example, indicating the position, the display effect, or the like of the interaction material), returns the interaction region response data to the interaction layer 4552 through the interface view controller 620. The interaction layer 4552 refreshes the interaction region according to the interaction region response data, that is, redisplays the interaction process in the interaction region.

In some other embodiments, when the application program is run again, and the position of the interaction region reaches the set position again, the information flow framework layer transmits an interaction operation on the interaction region to the interaction layer, receives the interaction response data determined by the interaction layer according to the interaction operation, and displays the interaction process in the interaction region according to the interaction response data.

In an example following FIG. 4B, the operating system 451 transmits the interaction operation (including parameters of an operation position and a type) to the information flow framework layer 4551 in the form of an event. The information flow framework layer 4551 transmits the interaction operation to the interaction layer 4552. The interaction layer 4552 transmits the interaction operation to the model 630 corresponding to the interaction layer 4552 through the interface view controller 620, and the model 630 corresponding to the interaction layer 4552 calculates interaction region response data (including a manner in which the interaction material responds to an operation, for example, indicating the position, the display effect, or the like of the interaction material), and returns the interaction region response data to the interaction layer 4552 through the interface view controller 620. The interaction layer 4552 transmits the interaction region response data to the information flow framework layer 4551. The information flow framework layer 4551 refreshes the interaction region according to the interaction region response data, that is, redisplays the interaction process in the interaction region.

In this embodiment of this application, in response to the user's operation of closing the application program, progress data corresponding to the interaction process is automatically cleared, so that a new round of interaction experience can be provided to the user after the user re-enters the application program, thereby satisfying diverse experience requirements of the user.

Using an example in which the first application program 500 is a browser, and information displayed in the interaction region is an H5 mini game (that is, the second application program 600 is an H5 mini game), the interaction processing method for an information flow provided in this embodiment of this application is described.

Figure 7:
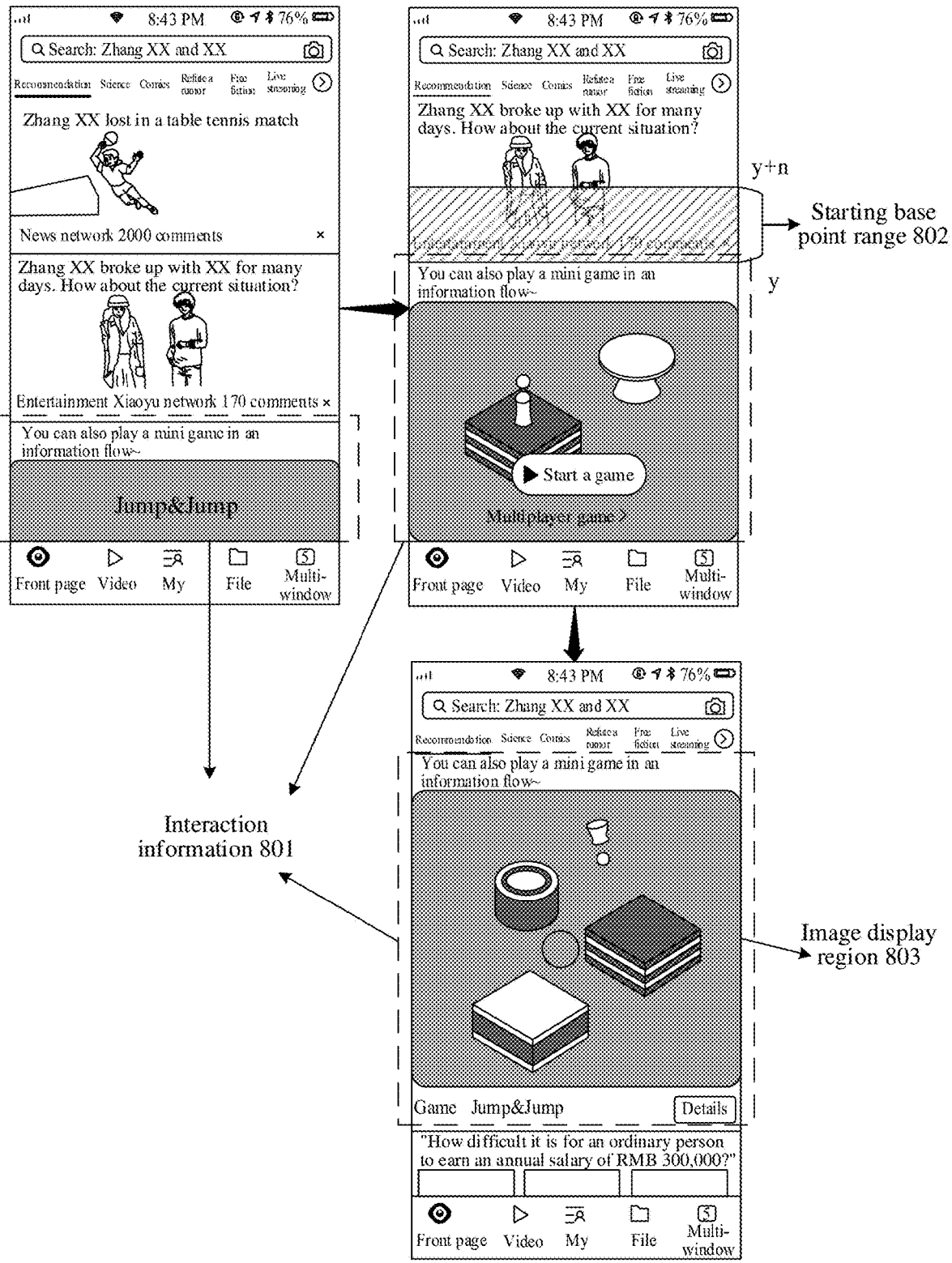
FIG. 7 is a schematic diagram of an application scenario according to an embodiment of this application.

FIG. 7 is a schematic diagram of an application scenario according to an embodiment of this application. In FIG. 7, when the user triggers to open the browser and performs a sliding operation to browse content of the information flow, special information 801 (hereinafter referred to as interaction information) may be randomly embedded in a browsing process. When a top part of the interaction information 801 reaches a starting base point range 802 [y, y+n], a mini game state is triggered, and the user can start to play the mini game through the interaction information. y is any height in the information flow display interface. For example, an overall height of the information flow display interface is 10 height units, y is 4, indicating that a position that is 4 height units away from a bottom part of the information flow interface is a starting position of the starting base point range, and n is a range of the starting base point range. y is greater than zero, and y+n is less than the overall height of the information flow display interface.

The user can directly perform a game interaction operation (that is, the foregoing interaction operation) in an image display region 803 (that is, the foregoing interaction region) of the interaction information to implement game interaction. When the user performs an operation outside the image display region 803, the operation does not take effect in the mini game. When the user clicks or taps other information flow content outside the image display region 803, a details page of the information flow content that the user clicks or taps is jumped to according to normal logic, and the mini game interaction is ended at the same time.

(1) Start and End Mechanisms

When the interaction information slides to the starting base point range [y, y+n] set in the information flow display interface, a start mechanism of the mini game is triggered, and the information flow display interface monitors a position of the interaction information and communicates with the H5 mini game. When the interaction information slides to the starting base point range, the H5 mini game is notified to start without requiring the user to manually click or tap an interface or jump to an interface. y is any height in the information flow display interface. For example, an overall height of the information flow display interface is 10 height units, y is 4, indicating that a position that is 4 height units away from a bottom part of the information flow interface is a starting position of the starting base point range, and n is a range of the starting base point range. y is greater than zero, and y+n is less than the overall height of the information flow display interface.

Figure 8:
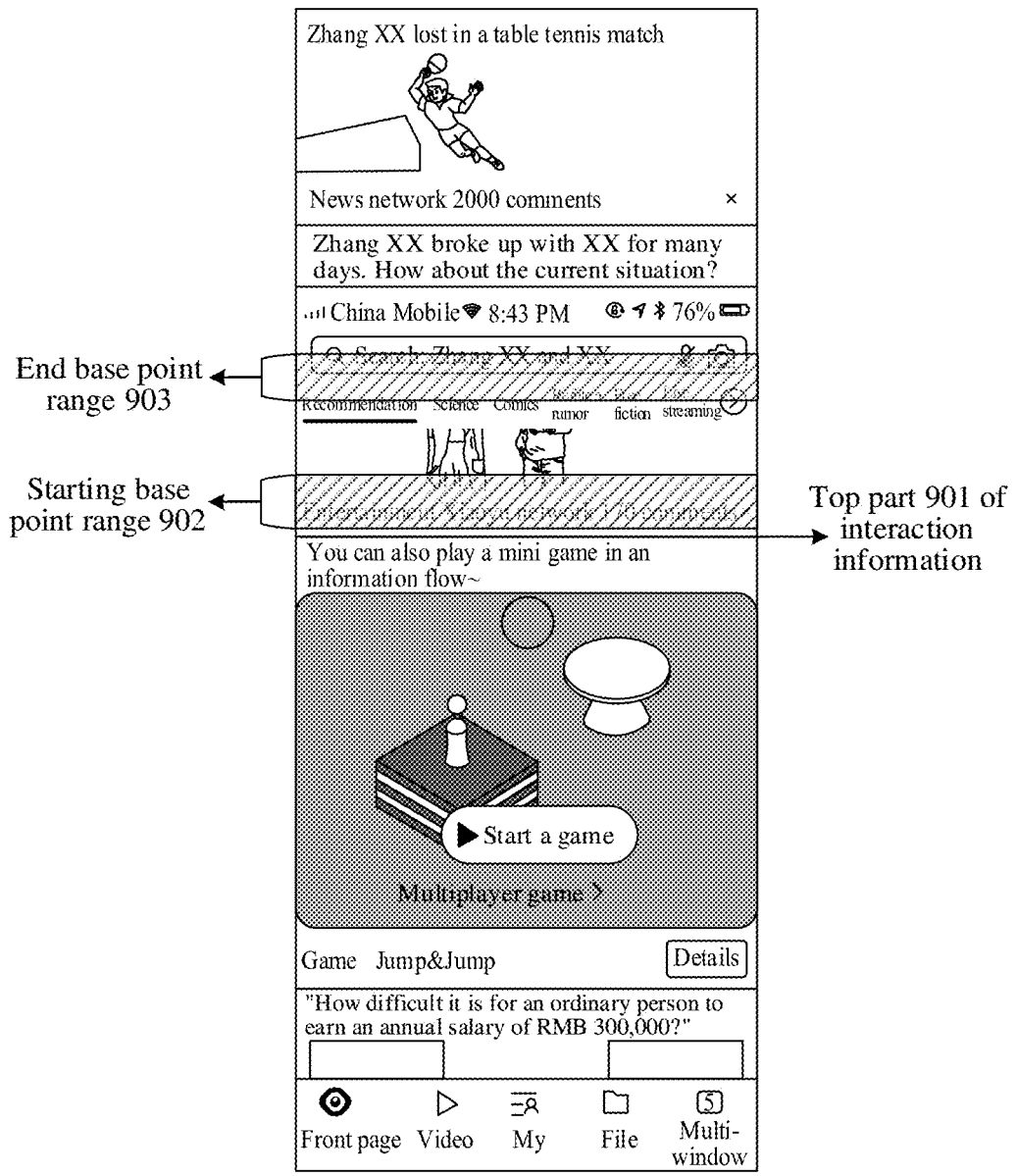
FIG. 8 is a schematic diagram of an application scenario according to an embodiment of this application.

FIG. 8 is a schematic diagram of an application scenario according to an embodiment of this application. In FIG. 8, regardless of whether the user performs an operation on the mini game (that is, whether the user is playing the mini game), the information flow can be slid at any time. When a top part 901 of the interaction information slides to an end base point range 903 [z, z+n], the H5 mini game is notified to pause. The H5 mini game does not make any response to resuming the game, and records data (that is, the foregoing progress data) of the last game played by the user, such as a game score, a position, and a game level. z is any height in the information flow display interface. For example, an overall height of the information flow display interface is 10 height units, z is 4, indicating that a position that is 4 height units away from a bottom part of the information flow interface is a starting position of the end base point range, and n is a range of the end base point range, where z is greater than zero, and z+n is less than the overall height of the information flow display interface. When the top part 901 of the interaction information slides to the starting base point range 902 [y, y+n], the information flow display interface notifies the H5 mini game to resume the game, implementing the technical effect of playing and exiting at will. y is any height in the information flow display interface. For example, an overall height of the information flow display interface is 10 height units, y is 4, indicating that a position that is 4 height units away from a bottom part of the information flow interface is a starting position of the starting base point range, and n is a range of the starting base point range. y is greater than zero, and y+n is less than the overall height of the information flow display interface.

(2) Preloading Manner

Figure 9:
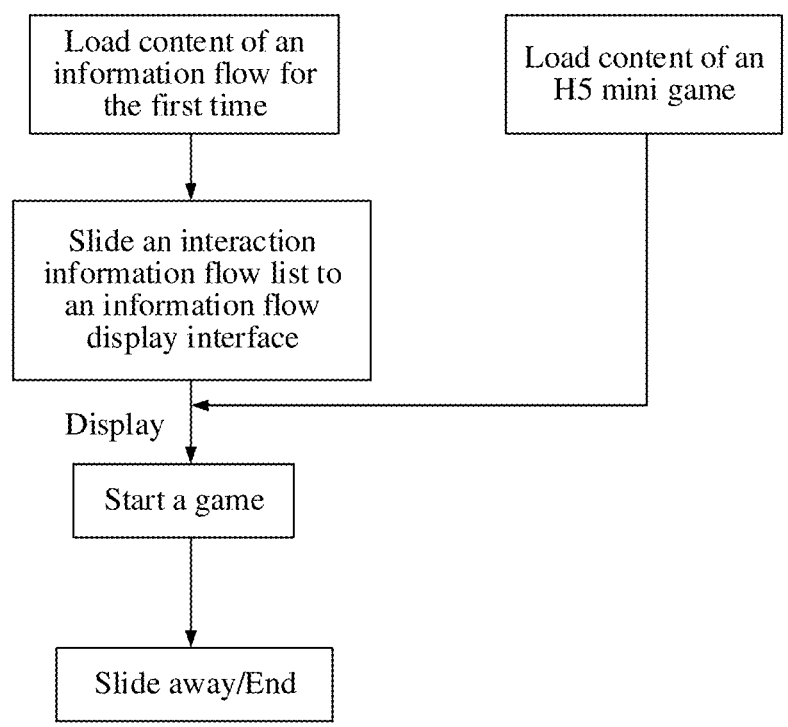
FIG. 9 is a schematic flowchart of an interaction processing method for an information flow according to an embodiment of this application.

FIG. 9 is a schematic flowchart of an interaction processing method for an information flow according to an embodiment of this application. In FIG. 9, a position of the interaction information (for example, which screen or which item is displayed) can be set on a backend of the application program. When the interaction information needs to be displayed to the user that is covered, and the user opens the browser to load the information flow, content of the H5 mini game is preloaded.

That is, the content of the H5 mini game is loaded while loading the content of the information flow. When the user slides the interaction information to the information flow display interface, a frontend can immediately display the content of the H5 mini game, so as to implement the technical effect of starting the game immediately.

(3) Opening an H5 Link in the Interaction Information

In related art, the information includes content of already downloaded pictures, text, or videos rather than content of a new web page. In this embodiment of this application, content of a web page link is inserted into the information flow, and the content of the web page link is integrated with the information flow framework. An example process includes two example solutions, which are:

Solution 1: FIG. 10A is a schematic diagram of a principle according to an embodiment of this application. In FIG. 10A, an interaction information display region 111 (that is, the foregoing interaction region) is hollowed out (that is, sets the interaction information display region 111 to be transparent). Displaying web page content through a hollow region is equivalent to creating, below the information flow, an interface layer in which a link of a web page is loaded to display the web page content.

In some embodiments, the browser simultaneously opens two windows, an upper window displays the content of the information flow of the browser, and a lower window displays the content of the H5 mini game, where the upper window covers the lower window. If there is interaction information in an information flow of the upper layer window, and the interaction information display region 111 does not display content of the upper layer window, but displays content of the lower layer window.

Solution 2: FIG. 10B is a schematic diagram of a principle according to an embodiment of this application. In FIG. 10B, an element (that is, the foregoing interaction material) of the H5 mini game is marked, and correspondingly reorganized according to a size of the interaction information display region 111. In this way, all the elements of the H5 mini game can be displayed in the interaction information display region 111.

There are two implementations for displaying all the elements of the H5 mini game in the interaction information display region 111, which are:

① Scale down a plurality of elements of the H5 mini game into the interaction information display region 111, and fill other vacant parts of the interaction information display region 111 with ordinary color blocks.

② A development side defines stretchable content, such as a bottom background or a top operation bar, in the interaction information display region 111. The stretchable content in the interaction information display region 111 can horizontally fill the interaction information display region 111 according to a size of the interaction information display region 111. For non-stretchable content such as text, an icon or a button, after filling the interaction information display region 111, the non-stretchable content is accordingly matched to a corresponding position of the interaction information display region 111.

(4) Communication between the information flow framework layer of the browser and the H5 mini game (interaction layer)

Figure 11:
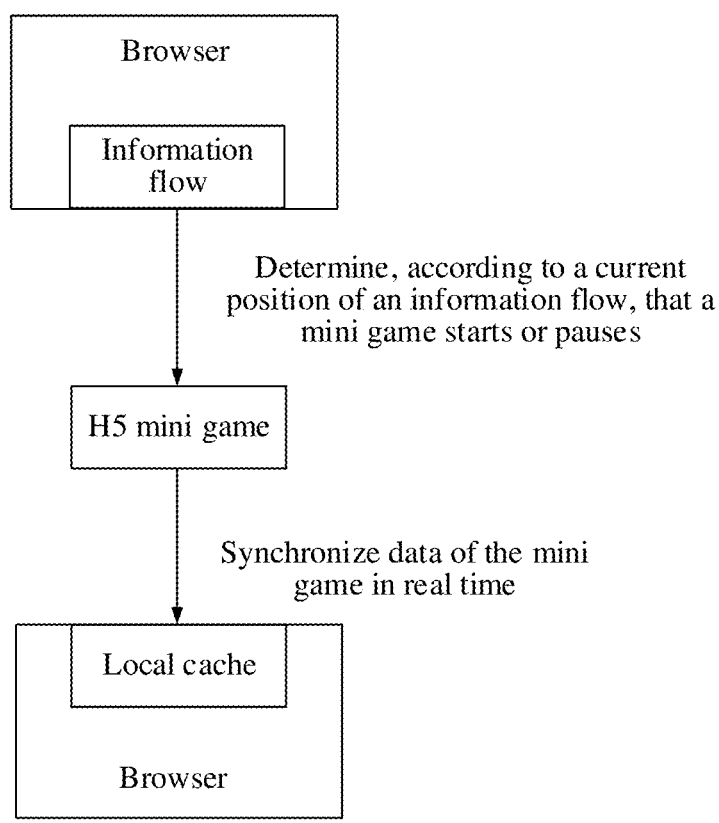
FIG. 11 is a schematic flowchart of an interaction processing method for an information flow according to an embodiment of this application.

FIG. 11 is a schematic flowchart of an interaction processing method for an information flow according to an embodiment of this application. In FIG. 11, the information flow framework layer of the browser transmits a current information flow operation and a sliding position of the user, as well as instructions on whether to start the game and end the game, to the interaction layer corresponding to the H5 mini game. The interaction layer returns data of the mini game to the browser and caches the data in a local cache of the browser. When the user closes the browser or clears the cache in the browser, the data of the game is cleared. In this case, when the user slides to the interaction information again, a new round of the game is restarted.

Using an example in which information displayed in the interaction region is a live stream, the interaction information carries a live stream room in live streaming. When a top part of the interaction information reaches a starting base point range [y, y+n], a search box (that is, the foregoing search region) displays a theme of the current live stream room. y is any height in the information flow display interface. For example, an overall height of the information flow display interface is 10 height units, y is 4, indicating that a position that is 4 height units away from a bottom part of the information flow interface is a starting position of the starting base point range, and n is a range of the starting base point range. y is greater than zero, and y+n is less than the overall height of the information flow display interface. When the user stops sliding, live stream content is played, and the user can directly watch the live stream. When the user continues to slide, the live stream content is not played. In this way, browsing the information flow and watching the live stream can be seamlessly switched, which provides the user with a smooth live stream watching experience while ensuring that a process of browsing the information flow is not disturbed by the live stream, thereby effectively improving the efficiency of man-machine interaction.

The following continues to describe an Example structure in which an interaction processing apparatus 455 for an information flow provided in this embodiment of this application is implemented as a software module. In some embodiments, as shown in FIG. 3, a software module stored on the interaction processing apparatus 455 for an information flow of the memory 450 may include: an information flow framework layer 4551, configured to display an information flow in an information flow region. The information flow framework layer 4551 is further configured to insert at least one interaction region between information in the information flow, and display at least one interaction material in the interaction region. The information flow framework layer 4551 is further configured to update the information in the information flow and a position of the interaction region in an information flow display interface in response to a movement operation on the information flow, and display an interaction process in the interaction region when the position of the interaction region reaches a set position. The interaction process includes a process in which the at least one interaction material changes with an interaction operation.

In some embodiments, the information flow framework layer 4551 is further configured to load a transparent region for avoiding the interaction region between the information in the information flow region. At least one of the at least one interaction region loaded by an interaction layer 4552 is displayed through the transparent region.

In some embodiments, the information flow framework layer 4551 is further configured to update positions of the information in the information flow according to a direction and a magnitude of the movement operation. The interaction layer 4552 is further configured to synchronously update the position of the interaction region according to the direction and the magnitude of the movement operation. The interaction region is continuously displayed through the transparent region.

In some embodiments, the interaction layer 4552 is further configured to generate interaction response data in response to an interaction operation on the interaction region; and display the interaction process in the interaction region according to the interaction response data.

In some embodiments, the information flow framework layer 4551 is further configured to clear, in response to an end operation on the application program, progress data corresponding to the interaction process; and redisplay the interaction process in the interaction region when the application program is run again, and the position of the interaction region reaches the set position again.

In some embodiments, the information flow framework layer 4551 is further configured to suspend displaying the interaction process in the interaction region, and record progress data corresponding to the interaction process when the position of the interaction region leaves the set position; and resume, according to the progress data, a progress of displaying the interaction process in the interaction region when the position of the interaction region reaches the set position again.

In some embodiments, an interface view of an application program run on an electronic device includes: an information flow framework layer 4551 and an interaction layer 4552; the information flow framework layer 4551 is configured to display an information flow in an information flow region. The information flow framework layer 4551 is configured to insert at least one interaction region between information in the information flow, and display at least one interaction material in the interaction region. The information flow framework layer 4551 is configured to update the information in the information flow and the position of the interaction region in the information flow display interface in response to a movement operation on the information flow, and transmit a first notification to the interaction region when the position of the interaction region reaches the set position, the first notification being used for instructing the interaction layer to display an interaction process in the interaction region, and the interaction process being displayed in the interaction region by the interaction layer.

In some embodiments, the interface view of the application program run on the electronic device further includes: a search layer 4553. The search layer 4553 is configured such that the information flow framework layer transmits a second notification to the search layer when the position of the interaction region reaches the set position, the second notification being used for instructing the search layer to display an interaction material corresponding to the interaction region in a loaded search region.

In some embodiments, the information flow framework layer 4551 is configured to transmit the interaction operation on the interaction region to the interaction layer 4552, receive interaction response data determined by the interaction layer 4552 according to the interaction operation, and display the interaction process in the interaction region according to the interaction response data.

In some embodiments, the information flow framework layer 4551 is configured to load the interaction region between the information in the information flow region. The interaction layer 4552 is configured to transmit at least one interaction material corresponding to the interaction region to the information flow framework layer. The information flow framework layer 4551 is configured to fill the at least one interaction material into the interaction region, the filled interaction material being used for adaptive display in the interaction region.

In some embodiments, the information flow framework layer 4551 is configured to transmit the interaction trigger operation to the interaction layer 4552 in response to receiving an interaction trigger operation on the interaction region, the interaction process being displayed in the interaction region by the interaction layer 4552.

An embodiment of this application provides a computer-readable storage medium, storing executable instructions, the executable instructions, when executed by a processor, causing the processor to perform the interaction processing method for an information flow provided in the embodiments of this application. For example, the interaction processing method for an information flow shown in FIG. 5 or FIG. 6.

An embodiment of this application provides a computer program product or a computer program. The computer program product or the computer program includes computer instructions, and the computer instructions are stored on a computer-readable storage medium. A processor of a computer device reads the computer instructions from the computer-readable storage medium, and executes the computer instructions, to cause the computer device to perform the interaction processing method for an information flow according to this embodiment of this application.

In some embodiments, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

In conclusion, the embodiments include at least the following examples of potential beneficial effects:

(1) An interaction region loaded by an interaction layer is displayed through a transparent region in an information flow framework layer, so that it may be unnecessary to divide an interaction material in the interaction region and then display the divided interaction material in the interaction region, which can greatly ensure the integrity of content displayed in the interaction region.

(2) The information flow framework layer fills the interaction material transmitted by the interaction layer into the interaction region formed by the information flow framework layer for adaptive display, which can organically combine the interaction material with the information flow framework layer, and improve the visual coherence when the user browses the information flow.

(3) The information flow framework layer and the interaction layer respectively control the information in the information flow and the position of the interaction region according to the movement operation, which can ensure that the interaction region loaded by the interaction layer can always be displayed through the transparent region in the information flow framework layer when the user browses the information flow, so that when the user browses the information flow, the problem that the interaction region cannot be displayed because the interaction region cannot keep up with a movement speed of the transparent region is avoided, thereby improving the visual coherence when the user browses the information flow.

(4) The information flow framework layer can directly update the positions of the information and the interaction region in the information flow according to the movement operation, which enhances a speed of updating the information and the position of the interaction region in the information flow, so that there is a high degree of consistency between the operation of the user and the movement of the information flow.

(5) When the position of the interaction region does not reach the set position, the interaction process can still be displayed in the interaction region according to a trigger operation of the user, which improves the diversity of the triggering of the interaction process and can avoid the problem that the application program fails to identify the position of the interaction region in time and consequently fails to display the interaction process in time, thereby improving the interaction experience of the user.

(6) The interaction layer displays the interaction process in the interaction region according to the interaction response data, and displays the interaction process in real time through the transparent region of the information frame layer, which reduces a quantity of transmissions of the interaction region response data, thereby enhancing the interaction efficiency.
(7) The information frame layer can directly display the interaction process in the interaction region according to the interaction response data, which enhances a response speed of the interaction region in the interaction process, so that there is a high degree of consistency between the interaction operation of the user and displaying the interaction process.
(8) In this embodiment of this application, the search layer is instructed to display the interaction material corresponding to the interaction region in the loaded search region, which can not only guide the user to perform an interaction operation when the user browses the information flow, to improve the monetization rate of information in the information flow, but also can prompt the user during the interaction operation of the user, to improve the interaction experience of the user.
(9) The progress data corresponding to the last moment at which the user slides away, so that when the user can resume, according to the progress data, the interaction process corresponding to the last moment at which the user slides away when the user slides to the interaction region again, so as to ensure that the user can continuously interact and improve the interaction experience of the user.
(10) After the user closes the application program, progress data corresponding to the interaction process is automatically cleared, so that a new round of interaction experience can be provided to the user after the user re-enters the application program, thereby satisfying diverse experience requirements of the user.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. An interaction processing method for an information flow comprises:
    displaying an information flow in an information flow region;
    inserting at least one interaction region between information in the information flow;
    displaying at least one interaction material in the at least one interaction region; and
    updating the information in the information flow and updating a position of the interaction region in an information flow display interface, in response to a movement operation on the information flow, and
    displaying an interaction process in the interaction region when the position of the interaction region reaches a set position, wherein the interaction process further comprises at least one interaction material change with an interaction operation
    wherein the updating, and the displaying the interaction process in the interaction region further comprises:
        updating, by the information flow framework layer, the information in the information flow and the position of the interaction region in the information flow display interface in response to the movement operation on the information flow, transmitting, by the information flow framework layer, a first notification to the interaction region when the position of the interaction region reaches the set position, the first notification providing instruction to the interaction layer to display an interaction process in the interaction region; and
        displaying, by the interaction layer, the interaction process in the interaction region.

2. The method according to claim 1, wherein the inserting further comprises: loading a transparent region for avoiding the interaction region between the information in the information flow region, wherein at least one of the at least one interaction region is displayed through the transparent region.

3. The method according to claim 2, wherein the updating further comprises: updating positions of the information in the information flow according to a direction and a magnitude of the movement operation; and
    synchronously updating the position of the interaction region according to the direction and the magnitude of the movement operation, wherein the interaction region being continuously displayed through the transparent region.

4. The method according to claim 2, wherein the displaying an interaction process in the interaction region further comprises:
    generating interaction response data in response to an interaction operation on the interaction region; and
    displaying the interaction process in the interaction region according to the interaction response data.

5. The method according to claim 4, wherein the method further comprises:
    clearing, in response to an end operation on an application program, progress data corresponding to the interaction process; and
    redisplaying the interaction process in the interaction region when the application program is run again, and the position of the interaction region reaches the set position again.

6. The method according to claim 4, wherein the method further comprises: suspending displaying the interaction process in the interaction region, and recording progress data corresponding to the interaction process when the position of the interaction region leaves the set position; and
    resuming, according to the progress data, a progress of displaying the interaction process in the interaction region when the position of the interaction region reaches the set position again.

7. The interaction processing method according to claim 1, wherein an interface view of an application program run on an electronic device further comprises:
    an information flow framework layer and an interaction layer;
    wherein the displaying an information flow in an information flow region comprises: displaying, by the information flow framework layer, the information flow in the information flow region;
    wherein the inserting and the displaying the at least one interaction material further comprises:
    inserting, by the information flow framework layer, the at least one interaction region between the information in the information flow; and
    displaying the at least one interaction material in the interaction region.

8. The method according to claim 7, wherein the interface view of the application program run on the electronic device further comprises:
    a search layer; and
    wherein the method further comprises:
    transmitting, by the information flow framework layer, a second notification to the search layer when the position of the interaction region reaches the set position, the second notification providing instruction to the search layer to display an interaction material corresponding to the interaction region in a loaded search region.

9. The method according to claim 7, wherein the displaying the interaction process in the interaction region further comprises:
transmitting, by the information flow framework layer, the interaction operation on the interaction region to the interaction layer; and
receiving, by the information flow framework layer, interaction response data determined by the interaction layer according to the interaction operation, and displaying the interaction process in the interaction region according to the interaction response data.

10. The method according to claim 7, wherein the inserting and the displaying the at least one interaction material further comprises:
loading, by the information flow framework layer, an interaction region between the information in the information flow region;
transmitting, by the interaction layer, at least one interaction material corresponding to the interaction region to the information flow framework layer; and filling, by the information flow framework layer, the at least one interaction material into the interaction region, the filled interaction material providing for an adaptive display in the interaction region.

11. The method according to claim 10, wherein the method further comprises: transmitting, when an interaction trigger operation on the interaction region is received by the information flow framework layer, the interaction trigger operation to the interaction layer; and displaying, by the interaction layer, the interaction process in the interaction region.

12. An electronic device, comprising:
a memory, configured to store executable instructions; and
a processor, configured to perform, when executing the executable instructions stored on the memory, the interaction processing method for an information flow according to claim 1.

13. An interaction processing apparatus for an information flow, comprising:
an information flow framework layer, configured to display an information flow in an information flow region, wherein the information flow framework layer is configured to:
insert at least one interaction region between information in the information flow;
display at least one interaction material in the interaction region;
wherein the information flow framework layer is further configured to update the information in the information flow and update a position of the interaction region in an information flow display interface in response to a movement operation on the information flow,
transmit a first notification to the interaction region when the position of the interaction region reaches the set position, the first notification providing instruction to the interaction layer to display an interaction process in the interaction region; and
display an interaction process in the interaction region when the position of the interaction region reaches a set position, wherein the interaction process further comprises at least one interaction material change with an interaction operation.

14. The interaction processing apparatus of claim 13, wherein the information flow framework layer is further configured to:
load a transparent region for avoiding the interaction region between the information in the information flow region, wherein at least one of the at least one interaction region is displayed through the transparent region.

15. The interaction processing apparatus of claim 13, wherein the information flow framework layer is further configured to:
update the positions of the information in the information flow according to a direction and a magnitude of the movement operation; and
synchronously update the position of the interaction region according to the direction and the magnitude of the movement operation, wherein the interaction region being continuously displayed through the transparent region.

16. The interaction processing apparatus of claim 13, wherein the information flow framework layer is further configured to:
generate interaction response data in response to an interaction operation on the interaction region; and
display the interaction process in the interaction region according to the interaction response data.

17. The interaction processing apparatus of claim 13, wherein the information flow display interface is further configured to include a search layer, wherein the information flow framework layer is further configured to:
transmit, by an information flow framework layer, a notification to the search layer when the position of the interaction region reaches the set position, the notification providing instruction to the search layer to display an interaction material corresponding to the interaction region in a loaded search region.

18. A non-transitory computer-readable storage medium, storing executable instructions, the executable instructions, when executed by a processor, implementing the following:
displaying an information flow in an information flow region;
inserting at least one interaction region between information in the information flow;
displaying at least one interaction material in the at least one interaction region;
and updating the information in the information flow and updating a position of the interaction region in an information flow display interface, in response to a movement operation on the information flow, and displaying an interaction process in the interaction region when the position of the interaction region reaches a set position, wherein the interaction process further comprises at least one interaction material change with an interaction operation
wherein the updating, and the displaying the interaction process in the interaction region further comprises:
updating, by the information flow framework layer, the information in the information flow and the position of the interaction region in the information flow display interface in response to the movement operation on the information flow,
transmitting, by the information flow framework layer, a first notification to the interaction region when the position of the interaction region reaches the set position, the first notification providing instruction to the interaction layer to display an interaction process in the interaction region; and displaying, by the interaction layer, the interaction process in the interaction region.

19. The computer-readable storage medium of claim 18, wherein an interface view of an application program run on an electronic device further comprises: an information flow framework layer and an interaction layer;
- wherein the displaying an information flow in an information flow region comprises: displaying, by the information flow framework layer, the information flow in the information flow region;
- wherein the inserting and the displaying the at least one interaction material further comprises:
- inserting, by the information flow framework layer, the at least one interaction region between the information in the information flow; and
- displaying the at least one interaction material in the interaction region.

20. The computer-readable storage medium of claim 19, wherein the displaying the interaction process in the interaction region further comprises:
- transmitting, by the information flow framework layer, the interaction operation on the interaction region to the interaction layer; and
- receiving, by the information flow framework layer, interaction response data determined by the interaction layer according to the interaction operation, and displaying the interaction process in the interaction region according to the interaction response data.

* * * * *